United States Patent
Foletto et al.

(10) Patent No.: US 9,140,536 B2
(45) Date of Patent: Sep. 22, 2015

(54) CIRCUITS AND METHODS USING A FIRST CYCLE OF A SIGNAL TO GENERATE A THRESHOLD SIGNAL USED FOR COMPARING TO A SECOND LATER CYCLE OF THE SIGNAL

(71) Applicant: Allegro Microsystems, LLC, Worcester, MA (US)

(72) Inventors: Andrea Foletto, Annecy (FR); Andreas P. Friedrich, Metz-Tessy (FR)

(73) Assignee: Allegro Microsystems, LLC, Worcester, MA (US)

( * ) Notice: Subject to any disclaimer, the term of this patent is extended or adjusted under 35 U.S.C. 154(b) by 0 days.

(21) Appl. No.: 14/061,106

(22) Filed: Oct. 23, 2013

(65) Prior Publication Data
US 2014/0062463 A1    Mar. 6, 2014

Related U.S. Application Data

(62) Division of application No. 12/793,813, filed on Jun. 4, 2010, now Pat. No. 8,598,867.

(51) Int. Cl.
| | |
|---|---|
| *G01B 7/30* | (2006.01) |
| *G01B 7/14* | (2006.01) |
| *G01D 5/14* | (2006.01) |
| *G01D 5/244* | (2006.01) |
| *G01P 3/488* | (2006.01) |
| *G01P 3/489* | (2006.01) |

(52) U.S. Cl.
CPC ... *G01B 7/14* (2013.01); *G01D 5/145* (2013.01); *G01D 5/24476* (2013.01); *G01P 3/488* (2013.01); *G01P 3/489* (2013.01)

(58) Field of Classification Search
CPC ..... G01B 7/14; G01D 5/145; G01D 5/24476; G01P 3/488; G01P 3/489
USPC .......... 324/207.2–207.25, 173–174
See application file for complete search history.

(56) References Cited

U.S. PATENT DOCUMENTS

| | | | |
|---|---|---|---|
| 4,015,466 | A | 4/1977 | Stick et al. |
| 4,185,265 | A | 1/1980 | Griffin et al. |
| 4,293,814 | A | 10/1981 | Boyer |

(Continued)

FOREIGN PATENT DOCUMENTS

| | | |
|---|---|---|
| DE | 197 49 791 A1 | 5/1999 |
| EP | 0 036 950 A1 | 10/1981 |

(Continued)

OTHER PUBLICATIONS

PCT Invitation to Pay Additional Fees with Partial Search Report dated Nov. 14, 2014; for PCT Pat. App. No. PCT/US2014/049882; 8 pages.

(Continued)

*Primary Examiner* — Jay Patidar
(74) *Attorney, Agent, or Firm* — Daly, Crowley, Mofford & Durkee, LLP

(57) ABSTRACT

A circuit to detect a movement of an object provides a threshold selection module that uses one or more threshold signals identified during a first cycle of a proximity signal prior to a second different cycle of the magnetic field signal in order to establish a threshold signal used to compare with the second cycle of the magnetic field signal. A method associated with the circuit is also described.

6 Claims, 12 Drawing Sheets

(56) References Cited

U.S. PATENT DOCUMENTS

| | | | |
|---|---|---|---|
| 4,367,721 A | 1/1983 | Boyer | |
| 4,374,333 A | 2/1983 | Avery | |
| 4,443,716 A | 4/1984 | Avery | |
| 4,476,901 A | 10/1984 | Sainen | |
| 4,705,964 A | 11/1987 | Higgs | |
| 4,906,928 A | 3/1990 | Gard | |
| 4,992,731 A | 2/1991 | Lorenzen | |
| 5,103,171 A | 4/1992 | Petersen | |
| 5,291,133 A | 3/1994 | Gokhale et al. | |
| 5,317,258 A | 5/1994 | Setzer et al. | |
| 5,442,283 A | 8/1995 | Vig et al. | |
| 5,459,398 A | 10/1995 | Hansen et al. | |
| 5,477,142 A | 12/1995 | Good et al. | |
| 5,493,219 A | 2/1996 | Makino et al. | |
| 5,497,084 A | 3/1996 | Bicking | |
| 5,497,086 A | 3/1996 | Hynek et al. | |
| 5,510,706 A | 4/1996 | Good | |
| 5,650,719 A | 7/1997 | Moody et al. | |
| 5,694,038 A | 12/1997 | Moody et al. | |
| 5,729,127 A | 3/1998 | Tamura et al. | |
| 5,821,745 A | 10/1998 | Makino et al. | |
| 5,917,320 A | 6/1999 | Scheller et al. | |
| 6,091,239 A | 7/2000 | Vig et al. | |
| 6,191,576 B1 | 2/2001 | Ricks et al. | |
| 6,204,658 B1 | 3/2001 | Stanusch et al. | |
| 6,242,908 B1 | 6/2001 | Scheller et al. | |
| 6,456,063 B1 | 9/2002 | Moreno et al. | |
| 6,522,131 B1 | 2/2003 | Hiligsmann et al. | |
| 6,525,531 B2 | 2/2003 | Forrest et al. | |
| 6,785,639 B2 | 8/2004 | Shirai et al. | |
| 7,138,793 B1 | 11/2006 | Bailey | |
| 7,184,876 B2 | 2/2007 | Teulings et al. | |
| 7,362,094 B2 | 4/2008 | Voisine et al. | |
| 8,350,563 B2 | 1/2013 | Haas et al. | |
| 8,598,867 B2 | 12/2013 | Foletto et al. | |
| 8,723,512 B1 | 5/2014 | Burdette et al. | |
| 8,736,260 B2 | 5/2014 | Foletto et al. | |
| 2005/0073297 A1 | 4/2005 | Walter et al. | |
| 2005/0075827 A1 | 4/2005 | Tsuruhara et al. | |
| 2009/0058404 A1 | 3/2009 | Kurumado | |
| 2011/0298447 A1 | 12/2011 | Foletto et al. | |
| 2011/0298448 A1 | 12/2011 | Foletto et al. | |
| 2011/0298449 A1 | 12/2011 | Foletto et al. | |
| 2011/0298450 A1 | 12/2011 | Foletto et al. | |
| 2012/0041711 A1 | 2/2012 | Jacoby et al. | |
| 2012/0249126 A1 | 10/2012 | Friedrich et al. | |
| 2013/0093416 A1 | 4/2013 | Haas et al. | |
| 2014/0062463 A1 | 3/2014 | Foletto et al. | |
| 2014/0195186 A1 | 7/2014 | Carbonne et al. | |
| 2014/0222364 A1 | 8/2014 | Foletto et al. | |
| 2014/0266176 A1 | 9/2014 | Fernandez et al. | |

FOREIGN PATENT DOCUMENTS

| | | |
|---|---|---|
| EP | 0 602 697 A1 | 6/1994 |
| EP | 0 621 460 A1 | 10/1994 |
| EP | 0 875 733 A2 | 11/1998 |
| EP | 0 875 733 A3 | 11/1998 |
| EP | 0 875 774 A2 | 11/1998 |
| GB | 2 309 311 A | 7/1997 |
| JP | 11-44554 | 2/1999 |
| JP | 2005-106822 | 4/2005 |
| WO | WO 00/51736 | 9/2000 |
| WO | WO 00/57136 | 9/2000 |
| WO | WO 02/054014 A1 | 7/2002 |
| WO | WO 2011/152948 A1 | 12/2011 |
| WO | WO 2013/017211 A1 | 2/2013 |

OTHER PUBLICATIONS

Notice of Allowance dated Oct. 28, 2013; for U.S. Appl. No. 13/865,287; 8 pages.

Allegro Data Sheet; "ATS612LSB Dynamic, Self-Calibrating, Peak-Detecting, Differential Hall-Effect Gear-Tooth Sensor," Sep. 6, 1996, 16 sheets.

Allegro Data Sheet; "ATS630, ATS631 True Power on Zero Speed Gear Tooth Sensor Sub-assembly with Adaptive Thresholds;" undated; 8 sheets.

Allegro Data Sheet; ATS630LSA and ATS631LSA Zero-Speed, Self-Calibrating, Hall-Effect Gear-Tooth True Power-On Sensors; Oct. 28, 1996; 12 sheets.

Burdette et al.; "Circuits and Methods for Generating a Threshold Signal Used in a Magnetic Field Sensor;" U.S. Appl. No. 13/685,287, filed Nov. 26, 2012; 56 pages.

Data Sheet; A1425; "High Accuracy Analog Speed Sensor IC with Integrated Filter Capacitor and Dual Zero-Crossing Output Signal;" as published by Allegro Microsystems, Inc.; Jun. 18, 2004; pp. 1-13.

Data Sheet; ATS673 and ATS674; "Self-Calibrating TPOS Gear Tooth Sensor ICs Optimized for Automotive Cam Sensing Applications;" as published by Allegro Microsystems, Inc.; Mar. 8, 2005; pp. 1-19.

Data Sheet; ATS675LSE; "Self-Calibrating TPOS Speed Sensor IC Optimized for Automotive Cam Sensing Applications;" as published by Allegro Microsystems, Inc.; Jul. 11, 2008; pp. 1-13.

Datel Intersil; Data Acquisition and Conversion Handbook, A Technical Guide, A/D and D/A Converting and their Applications; Jan. 1980; 3 sheets.

Fletcher; "An Engineering Approach to Digital;" Prentice Hall, Inc., Englewood Cliffs, NJ; Jan. 1980; 2 sheets.

Graeme et al.; "Operational Amplifiers Design and Applications;" McGraw-Hill Book Company; Jun. 1, 1974; 3 sheets.

Motorola; "Linear/Interface Integrated Circuits;" Series D, Motorola Inc.; Jan. 1983; 2 sheets.

Office Action; dated Jun. 26, 1998; U.S. Appl. No. 08/847,703; 6 sheets.

Response with Terminal Disclaimer; filed Sep. 14, 1998; for U.S. Appl. No. 08/847,703; 5 sheets.

Notice of Allowability; date illegible; for U.S. Appl. No. 08/847,703; 4 sheets.

Rule 32 C.F.R. §1.312(a) Amendment; dated Dec. 17, 1998; for U.S. Appl. No. 08/847,703; 4 sheets.

Acceptance of 312 Amendment; dated Jun. 28, 1999; for U.S. Appl. No. 08/847,703; 3 sheets.

Office Action; dated Sep. 27, 2000; for U.S. Appl. No. 09/275,209; 4 pages.

Response with Terminal Disclaimer; filed Dec. 5, 2000; for U.S. Appl. No. 09/275,209; 6 pages.

Notice of Allowance; dated Jan. 26, 2001; for U.S. Appl. No. 09/275,209; 9 pages.

Office Action; dated May 7, 2002; for U.S. Appl. No. 09/859,093; 4 pages.

Response with Terminal Disclaimer; filed May 28, 2002; for U.S. Appl. No. 09/859,093; 7 pages.

Notice of Allowance; dated Aug. 26, 2002; for U.S. Appl. No. 09/859,093; 11 pages.

Office Action dated Sep. 24, 2013, U.S. Appl. No. 13/685,287, filed Nov. 26, 2012, 14 pages.

Response to Office Action dated Sep. 24, 2013, for U.S. Appl. No. 13/685,287, filed Nov. 26, 2012, 11 pages.

Office Action/Restriction Requirement dated Feb. 27, 2013; for U.S. Appl. No. 12/793,813; 6 pages.

Response to Office Action/Restriction Requirement dated Feb. 27, 2013; for U.S. Appl. No. 12/793,813; 6 pages.

Notice of Allowance dated Aug. 2, 2013; for U.S. Appl. No. 12/793,813; 20 pages.

PCT Search Report; dated Jun. 23. 2000; for PCT Pat. App. No. PCT/US00/02614; 2 sheets.

PCT International Preliminary Report on Patentability; dated May 17, 2001; for PCT Pat. App. No. PCT/US00/02614; 13 sheets.

PCT Search Report dated May 14, 2000; for PCT Pat. App. No. PCT/US01/42546; 1 sheet.

Response to PCT Written Opinion; dated Aug. 27, 2002; for PCT/US01/42546; 1 sheet.

PCT International Preliminary Report on Patentability; dated Feb. 6, 2004; for PCT/US01/42546; 6 sheets.

PCT Search Report and Written Opinion of the ISA; dated Aug. 11, 2011; for PCT Pat. App. No. PCT/US2011/035148; 11 pages.

(56) References Cited

OTHER PUBLICATIONS

Response filed Jun. 10, 2013; to PCT Written Opinion dated Dec. 13, 2012; 18 pages.
PCT International Preliminary Report on Patentability of the ISA; dated Dec. 13, 2012; for PCT Pat. App. No. PCT/US2011/035148; 9 sheets.
Notification of Transmittal of the International Search Report and Written Opinion dated Jan. 8, 2014 for Application No. PCT/US2013/065848, filed Oct. 21, 2013, 11 pages.
Notice of Allowance dated Mar. 3, 2014 for U.S. Appl. No. 13/685,287, filed Nov. 26, 2012, 6 pages.
Letter to Yuasa and Hara dated Mar. 19, 2014, and including 312 Amendment; for Japanese Pat. App. No. 2013-513175; 23 pages.
Letter from Yuasa and Hara dated Apr. 24, 2014; for Japanese Pat. App. No. 2013-513175; 1 page.
Japanese Voluntary Amendment (with Claims in English) filed Apr. 8, 2014; for Japanese Pat. App. No. 2013-513175; 23 pages.
U.S. Appl. No. 14/452,823, filed Aug. 6, 2014, Fernandez, et al.
PCT Search Report and Written Opinion of the ISA dated Feb. 27, 2015 for PCT Pat. App. No. PCT/US2014/049882; 24 pages.
Letter from Yuasa and Hara dated Mar. 31, 2015; for Japanese Pat. App. No. 2013-213175; 1 page.
Japanese Response filed on Mar. 10, 2015; for Japanese Pat. App. No. 2013-213175; 11 pages.
Japanese Claims (English translation) filed Mar. 10, 2015; for Japanese Pat. App. No. 2013-213175; 10 pages.
Letter from Yuasa and Hara dated Apr. 1, 2015; for Japanese Pat. App. No. 2013-213175; 1 page.
Japanese Notice of Allowance received Apr. 1, 2015; for Japanese Pat. App. No. 2013-213175; 3 pages.
Japanese Allowed Claims received Apr. 1, 2015; Japanese Pat. App. No. 2013-213175; 9 pages.
Japanese Office Action (English translation) dated Dec. 17, 2014; for Japanese Pat. App. No. 2013-513175; 3 pages.
International Preliminary Report on Patentability dated Jun. 4, 2015 for PCT Application No. PCT/US2013/065848; 8 pages.

CIRCUITS AND METHODS USING A FIRST CYCLE OF A SIGNAL TO GENERATE A THRESHOLD SIGNAL USED FOR COMPARING TO A SECOND LATER CYCLE OF THE SIGNAL

CROSS REFERENCE TO RELATED APPLICATIONS

This application is a Divisional application of and claims the benefit of U.S. patent application Ser. No. 12/793,813, filed Jun. 4, 2010, which is incorporated herein by reference in its entirety.

STATEMENT REGARDING FEDERALLY SPONSORED RESEARCH

Not Applicable.

FIELD OF THE INVENTION

This invention relates generally to integrated circuits and, more particularly, to integrated circuits for detecting a movement or a rotation of a ferromagnetic object.

BACKGROUND OF THE INVENTION

Magnetic field sensors (e.g., rotation detectors) for detecting ferromagnetic articles and/or magnetic articles are known. The magnetic field associated with the ferromagnetic article or magnetic article is detected by a magnetic field sensing element, such as a Hall element or a magnetoresistance element, which provides a signal (i.e., a magnetic field signal) proportional to a detected magnetic field. In some arrangements, the magnetic field signal is an electrical signal.

The magnetic field sensor processes the magnetic field signal to generate an output signal that changes state each time the magnetic field signal crosses thresholds, either near to peaks (positive and/or negative peaks) or near to some other level, for example, zero crossings of the magnetic field signal. Therefore, the output signal has an edge rate or period indicative of a speed of rotation of the ferromagnetic or magnetic object, for example, a gear or a ring magnet.

One application for a magnetic field sensor is to detect the approach and retreat of each tooth of a rotating ferromagnetic gear, either a hard magnetic gear or a soft ferromagnetic gear, in some particular arrangements, a ring magnet having magnetic regions (permanent or hard magnetic material) with alternating polarity is coupled to the ferromagnetic gear or is used by itself and the magnetic field sensor is responsive to approach and retreat of the magnetic regions of the ring magnet. In other arrangements, a gear is disposed proximate to a stationary magnet and the magnetic field sensor is responsive to perturbations of a magnetic field as the gear rotates.

In one type of magnetic field sensor, sometimes referred to as a peak-to-peak percentage detector (or threshold detector), one or more threshold levels are equal to respective percentages of the peak-to-peak magnetic field signal. One such peak-to-peak percentage detector is described in U.S. Pat. No. 5,917,320 entitled "Detection of Passing Magnetic Articles While Periodically Adapting Detection Threshold" and assigned to the assignee of the present invention.

Another type of magnetic field sensor, sometimes referred to as a slope-activated detector (or peak-referenced detector, or peak detector for short), is described in U.S. Pat. No. 6,091,239 entitled "Detection Of Passing Magnetic Articles With a Peak Referenced Threshold Detector," also assigned to the assignee of the present invention. In the peak referenced magnetic field sensor, the threshold signal differs from the positive and negative peaks (i.e., the peaks and valleys) of the magnetic field signal by a predetermined amount. Thus, in this type of magnetic field sensor, the output signal changes state when the magnetic field signal comes away from a peak or valley of the magnetic field signal by the predetermined amount.

It should be understood that, because the above-described threshold detector and the above-described peak detector both have circuitry that can identify the positive and negative peaks of a magnetic field signal, the threshold detector and the peak detector both include a circuit portion referred to as a "peak identifier" herein, which is configured to detect positive peaks and/or negative peaks of the magnetic field signal. The threshold detector and the peak detector, however, each use the detected peaks in different ways to provide a so-called "threshold generator," which is configured to use the identified peaks to generate one or more thresholds against which the magnetic field signal can be compared. This comparison can result in a so-called "PosComp" signal that has an edge rate representative of a speed of movement, e.g., rotation, of the moving object.

In order to accurately detect the positive and negative peaks of a magnetic field signal, in some embodiments, the rotation detector can be capable of tracking at least part of the magnetic field signal. To this end, typically, one or more digital-to-analog converters (DACs) can be used to generate a tracking signal, which tracks the magnetic field signal. For example, in the above-referenced U.S. Pat. Nos. 5,917,320 and 6,091,239, two DACs are used, one (PDAC) to detect the positive peaks of the magnetic field signal and the other (NDAC) to detect the negative peaks of the magnetic field signal.

Some types of rotation detectors perform one or more types of initialization or calibration, for example, at a time near to start up or power up of the rotation detector, or otherwise, from time to time as desired. During one type of calibration, the above-described threshold level is determined.

Some moving objects, for example, rotating moving objects, which are sensed by the above-described magnetic field sensors, exhibit irregular motions or have irregular features. For example, a gear may have wobble as it rotates, it may have run out (asymmetry about its axis of rotation), or it may have irregularities in its mechanical dimensions, for example, some gear teeth may be wider than others. These irregularities tend to result in generation of thresholds that are not ideal. The non-ideal threshold tends to result in a PosComp signal that has edges that are not accurately placed relative to cycles of the magnetic field signal associated with the moving object.

It would, therefore, be desirable to provide a magnetic field sensor that can accurately identify a threshold level associated with a magnetic field signal, accurate even in the presence of irregularities in the motion of or in the mechanical characteristics of, the moving object being sensed.

SUMMARY OF THE INVENTION

The present invention provides a magnetic field sensor that can accurately identify a threshold level associated with a magnetic field signal, accurate even in the presence of irregularities in the motion of, or in the mechanical characteristics of, the moving object being sensed.

In accordance with a first aspect of the present invention, a circuit for detecting a movement of an object includes at least one magnetic field sensing element for generating a DIFF signal proportional to a magnetic field associated with the object, wherein the DIFF signal has cycles including a present cycle. The circuit also includes at least one motion detector configured to generate a motion signal indicative of the movement of the object, wherein the motion signal has edges associated with the cycles of the DIFF signal. The at least one motion detector includes a threshold generator circuit coupled to receive the DIFF signal and configured to generate a threshold signal. The at least one motion detector also includes at least one threshold selection module coupled to receive the threshold signal, configured to save samples of the threshold signal, configured to select samples of the threshold signal associated with of a prior cycle of the DIFF signal a predetermined number of cycles before the present cycle, and configured to generate a selected threshold signal related to the selected samples of the threshold signal. The at least one motion detector also includes a comparator coupled to receive a signal representative of the selected threshold signal, coupled to receive the DIFF signal, configured to compare the signal representative of the selected threshold signal with the DIFF signal, and configured to generate the motion signal.

In some embodiments of the first aspect of the present invention, the at least one threshold selection module is further configured to select a plurality of samples of the threshold signal associated with a respective plurality of prior cycles of the DIFF signal, wherein each one of the plurality of prior cycles is a respective predetermined number of cycles before the present cycle, wherein the at least one threshold selection module further includes a function processor configured to combine the plurality of samples of the threshold signal to generate the selected threshold signal.

In some embodiments of the above invention, the function processor is configured to average the plurality of samples of the threshold signal to generate the selected threshold signal.

In some embodiments of the first aspect of the present invention, the at least one threshold selection module includes an analog-to-digital converter coupled to receive the threshold signal and configured to convert the threshold signal to digital samples of the threshold signal, a memory coupled to receive the digital samples and configured to save a plurality of the digital samples, and a digital-to-analog converter coupled to receive samples related to selected ones of the plurality of the digital samples and configured to generate the selected threshold signal related to the selected ones of the plurality of the digital samples.

In some embodiments of the above invention, the memory comprises a multi-bit digital shift register.

In some embodiments of the first aspect of the present invention, the at least one threshold selection module includes an analog memory coupled to receive the threshold signal and configured to save a plurality of analog samples of the threshold signal, and a selection circuit module configured to select analog samples from among the plurality of analog samples and configured to generate the selected threshold signal related to the selected analog samples.

In some embodiments of the above invention, the analog memory comprises an analog shift register.

In some embodiments of the first aspect of the present invention, the circuit further includes a combining circuit configured to combine the threshold signal with the selected threshold signal to provide the signal representative of the selected threshold signal.

In some embodiments of the first aspect of the present invention, the circuit further includes a splitting circuit configured to split the selected threshold signal into first and second different selected threshold signals and configured to provide, at different respective times, the first and second different selected threshold signals as the signal representative of the selected threshold signal.

In some embodiments of the first aspect of the present invention, the threshold generator circuit is configured to generate first and second different threshold signals. Furthermore, the at least one motion detector includes first and second threshold selection modules, wherein the first threshold selection module is coupled to receive the first threshold signal, configured to save samples of the first threshold, configured to select samples of the first threshold signal associated with of a cycle of the DIFF signal a first predetermined number of cycles before the present cycle, and configured to generate a first selected threshold signal related to the selected samples of the first threshold signal. Furthermore, the second threshold selection module is coupled to receive the second threshold signal, configured to save samples of the second threshold signal, configured to select samples of the second threshold signal associated with of a cycle of the DIFF signal a second predetermined number of cycles before the present cycle, and configured to generate a second selected threshold signal related to the selected samples of the second threshold signal. Furthermore, the circuit further includes a splitting circuit coupled to receive the first and second selected threshold signals and configured to provide, at different respective times, the first and second selected threshold signals as the signal representative of the selected threshold signal.

In some embodiments of the first aspect of the present invention, the threshold generator circuit includes a PDAC configured to generate a PDAC output signal to track the DIFF signal during a PDAC update time interval and to hold the DIFF signal at times outside of the PDAC update time interval, and an NDAC configured to generate an NDAC output signal to track the DIFF signal during an NDAC update time interval and to hold the DIFF signal at times outside of the NDAC update time interval.

In some embodiments of the above invention, the threshold generator circuit includes a resistor ladder coupled to receive the PDAC output signal at a first end, coupled to receive the NDAC output signal at a second end, and configured to generate the threshold signal at an intermediate tap between the first and second ends.

In some embodiments of the above invention, the threshold generator circuit includes a first voltage source coupled to receive the PDAC output signal and configured to generate a first threshold signal, and a second different voltage source coupled to receive the NDAC output signal and configured to generate a second different threshold signal.

In some embodiments of the first aspect of the present invention, the threshold generator circuit comprises a resistor ladder coupled to receive a tracking signal that tracks the DIFF signal.

In some embodiments of the first aspect of the present invention, the at least one magnetic field sensing element includes at least two magnetic field sensing elements for generating an RDIFF signal and an LDIFF signal, wherein the RDIFF signal has cycles including a present RDIFF cycle and the LDIFF signal has cycles including a present RDIFF cycle. Furthermore, the at least one motion detector includes first and second motion detectors coupled to receive the RDIFF and LDIFF signals, respectively, wherein the first motion detector is configured to generate a first motion signal indicative of the movement of the object, and wherein the second motion detector is configured to generate a second motion signal indicative of the movement of the object.

In some embodiments of the above invention, the first motion detector and the second motion detector are configured to generate first and second respective tracking signals to track the RDIFF signal and to track the LDIFF signal, respectively.

In some embodiments of the above invention, the first motion detector includes a first PDAC configured to generate a first PDAC output signal to track the RDIFF signal during a first PDAC update time interval and to hold the RDIFF signal at times outside of the first PDAC update time interval, a first NDAC configured to generate a first NDAC output signal to track the RDIFF signal during a first NDAC update time interval and to hold the RDIFF signal at times outside of the first NDAC update time interval, a first threshold generator circuit coupled to receive the RDIFF signal and configured to generate a first motion detector threshold signal, and a first at least one threshold selection module coupled to receive the first motion detector threshold signal, configured to save samples of the first motion detector threshold signal, configured to select samples of the first motion detector threshold signal associated with a cycle of the RDIFF signal a first predetermined number of cycles before the present RDIFF cycle, and configured to generate a first selected threshold signal related to the selected samples of the first motion detector threshold signal. Furthermore, the comparator includes a first comparator coupled to receive a signal representative of the first selected threshold signal, coupled to receive the RDIFF signal, configured to compare the signal representative of the first selected threshold signal with the RDIFF signal, and configured to generate the first motion signal. Furthermore, the second motion detector includes a second PDAC configured to generate a second PDAC output signal to track the LDIFF signal during a second PDAC update time interval and to hold the LDIFF signal at times outside of the second PDAC update time interval, a second NDAC configured to generate a second NDAC output signal to track the LDIFF signal during a second NDAC update time interval and to hold the LDIFF signal at times outside of the second NDAC update time interval, a second threshold generator circuit coupled to receive the LDIFF signal and configured to generate a second motion detector threshold signal, and a second at least one threshold selection module coupled to receive the second motion detector threshold signal, configured to save samples of the second motion detector threshold signal, configured to select samples of the second motion detector threshold signal associated with a cycle of the LDIFF signal a second predetermined number of cycles before the present LDIFF cycle, and configured to generate a second selected threshold signal related to the selected samples of the first motion detector threshold signal, Furthermore, the comparator further includes a second comparator coupled to receive a signal representative of the second selected threshold signal, coupled to receive the LDIFF signal, configured to compare the signal representative of the second selected threshold signal with the LDIFF signal, and configured to generate the second motion signal.

In accordance with a second aspect of the present invention, a method of detecting a movement of an object includes generating a DIFF signal proportional to a magnetic field associated with the object, wherein the DIFF signal has cycles including a present cycle. The method also includes generating a motion signal indicative of the movement of the object, wherein the motion signal has edges associated with the cycles of the DIFF signal. The generating the motion signal includes generating a threshold signal in accordance with the DIFF signal. The generating the motion signal also includes saving samples of the threshold signal and selecting samples of the threshold signal associated with a prior cycle of the DIFF signal a predetermined number of cycles before the present cycle. The generating the motion signal also includes generating a selected threshold signal related to the selected samples of the threshold signal, and comparing a signal representative of the selected threshold signal with the DIFF signal to generate the motion signal.

In some embodiments of the second aspect of the present invention, the method further includes selecting a plurality of samples of the threshold signal associated with a respective plurality of cycles of the DIFF signal, wherein each one of the plurality of cycles is a respective predetermined number of cycles before the present cycle, and combining the plurality of samples of the threshold signal to generate the selected threshold signal.

In some embodiments of the above invention, the combining comprises averaging the plurality of samples of the threshold signal to generate the selected threshold signal.

In some embodiments of the second aspect of the present invention, the saving includes converting the threshold signal to digital samples, and saving a plurality of the digital samples. Furthermore the generating the selected threshold signal includes generating the selected threshold signal related to the selected ones of the plurality of the digital samples.

In some embodiments of the above invention, the saving the plurality of the digital samples comprises saving the plurality of the digital samples in a multi-bit digital shift register.

In some embodiment of the second aspect of the present invention, the saving comprises saving analog samples of the threshold signal.

In some embodiments of the above invention, the saving the analog samples comprises saving the analog samples of the threshold signal in an analog memory comprising an analog shift register.

In some embodiments of the second aspect of the present invention, the method further includes combining the threshold signal with the selected threshold signal to provide the signal representative of the selected threshold signal.

In some embodiments of the second aspect of the present invention, the method further includes splitting the selected threshold signal into first and second different selected threshold signals, and providing, at different respective times, the first and second different selected threshold signals as the signal representative of the selected threshold signal.

In some embodiment of the second aspect of the present invention, the generating the threshold signal comprises generating first and second different threshold signals. Furthermore, the saving the samples of the threshold signal includes saving samples of the first threshold signal and saving samples of the second different threshold signal. Furthermore, the selecting the samples of the threshold signal includes selecting samples of the first threshold signal associated with a cycle of the DIFF signal a first predetermined number of cycles before the present cycle, and selecting samples of the second different threshold signal associated with a cycle of the DIFF signal a second predetermined number of cycles before the present cycle. Furthermore, the generating the selected threshold signal includes generating a first selected threshold signal related to the selected samples of the first threshold signal, and generating a second selected threshold signal related to the selected samples of the second threshold signal. Furthermore, the method further includes providing, at different respective times, the first and second selected threshold signals as the signal representative of the selected threshold signal.

In some embodiment of the second aspect of the present invention, the generating the tracking signal includes generating a PDAC output signal to track the DIFF signal during a PDAC update time interval and to hold the DIFF signal at times outside of the PDAC update time interval, and generating an NDAC output signal to track the DIFF signal during an NDAC update time interval and to hold the DIFF signal at times outside of the NDAC update time interval.

In some embodiments of the above invention, the generating the threshold signal includes receiving the PDAC output signal at a first end of a resistor ladder, receiving the NDAC output signal at a second end of the resistor ladder, and generating the threshold signals at an intermediate tap between the first and second ends.

In some embodiments of the above invention, the generating the threshold signal includes receiving the PDAC output signal with a first voltage source and receiving the NDAC output signal with a second voltage source. Furthermore, the generating the threshold signal includes generating a first threshold signal with the first voltage source, and generating a second different threshold signal with the second voltage source.

In some embodiments of the second aspect of the present invention, the generating the threshold signal includes receiving the tracking signal with a resistor ladder, and generating the threshold signal at an intermediate tap of the resistor ladder.

In some embodiments of the second aspect of the present invention, the generating the DIFF signal includes generating an RDIFF signal and generating an LDIFF signal, each proportional to the magnetic field, wherein the RDIFF signal has cycles including a present RDIFF cycle and the LDIFF signal has cycles including a present LDIFF cycle. Furthermore, the generating the motion signal includes generating a first motion signal in accordance with the RDIFF signal and generating a second motion signal in accordance with the LDIFF signal.

In some embodiments of the above invention, the generating the tracking signal includes generating a first tracking signal that tracks the RDIFF signal and that holds peaks of the RDIFF signal, and generating a second tracking signal that tracks the LDIFF signal and that holds peaks of the LDIFF signal.

In some embodiments of the above invention, the generating the first tracking signal includes generating a first PDAC output signal to track the RDIFF signal during a first PDAC update time interval and to hold the RIFF signal at times outside of the first PDAC update time interval, and generating a first NDAC output signal to track the RDIFF signal during a first NDAC update time interval and to hold the RDIFF signal at times outside of the first NDAC update time interval. Furthermore, the generating the second tracking signal includes generating a second PDAC output signal to track the LDIFF signal during a second PDAC update time interval and to hold the LDIFF signal at times outside of the second PDAC update time interval, and generating a second NDAC output signal to track the LDIFF signal during a second NDAC update time interval and to hold the LDIFF signal at times outside of the second. NDAC update time interval. Furthermore, the generating the threshold signal includes generating a first motion detector threshold signal related to at least one of the first PDAC output signal or the first NDAC output signal, and generating a second motion detector threshold signal related to at least one of the second PDAC output signal or the second NDAC output signal. Furthermore, the saving the samples of the threshold signal includes saving samples of the first motion detector threshold signal and saving samples of the second motion detector threshold signal. Furthermore, the selecting the samples of the threshold signal includes selecting samples of the first motion detector threshold signal associated with a cycle of the RDIFF signal a first predetermined number of cycles before the present RDIFF cycle, and selecting samples of the second motion detector threshold signal associated with a cycle of the LDIFF signal a second predetermined number of cycles before the present LDIFF cycle. Furthermore, the generating the selected threshold signal includes generating a first selected threshold signal related to the selected samples of the first motion detector threshold signal, and generating a second selected threshold signal related to the selected samples of the second motion detector threshold signal. Furthermore, the comparing includes comparing a first signal representative of the first selected threshold signal with the RDIFF signal to generate the first motion signal, and comparing a second signal representative of the second selected threshold signal with the LDIFF signal to generate the second motion signal.

In accordance with a third aspect of the present invention, a method of detecting movement of an object includes generating a magnetic field signal with at least one magnetic field sensing element. The magnetic field signal is proportional to a magnetic field associated with the object and the magnetic field signal has cycles including a present cycle. The method also includes generating a tracking signal that track at least a portion of the magnetic field signal and using the tracking signal to generate a selected threshold signal in accordance with a prior cycle of the magnetic field signal prior to the present cycle.

In some embodiments of the third aspect of the present invention, the object is configured to rotate, and the cycle of the magnetic field signal prior to the present cycle is associated with a past revolution of the object.

In some embodiments of the third aspect of the present invention, the object is configured to rotate. Furthermore, the object has features associated with the cycles as they pass most proximate to the at least one magnetic field sensing element. Furthermore, the cycle of the magnetic field signal prior to the present cycle is associated with a feature of the object that previously passed most proximate to the at least one magnetic field sensing element.

In some embodiments of the third aspect of the present invention, the using includes selecting a first sample of the tracking signal a first predetermined number of cycles prior to the present cycle, selecting a second sample of the tracking signal a second predetermined number of cycles prior to the present cycle, and combining the first and second samples.

In some embodiments of the above invention, the combining comprises averaging the first and second samples.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
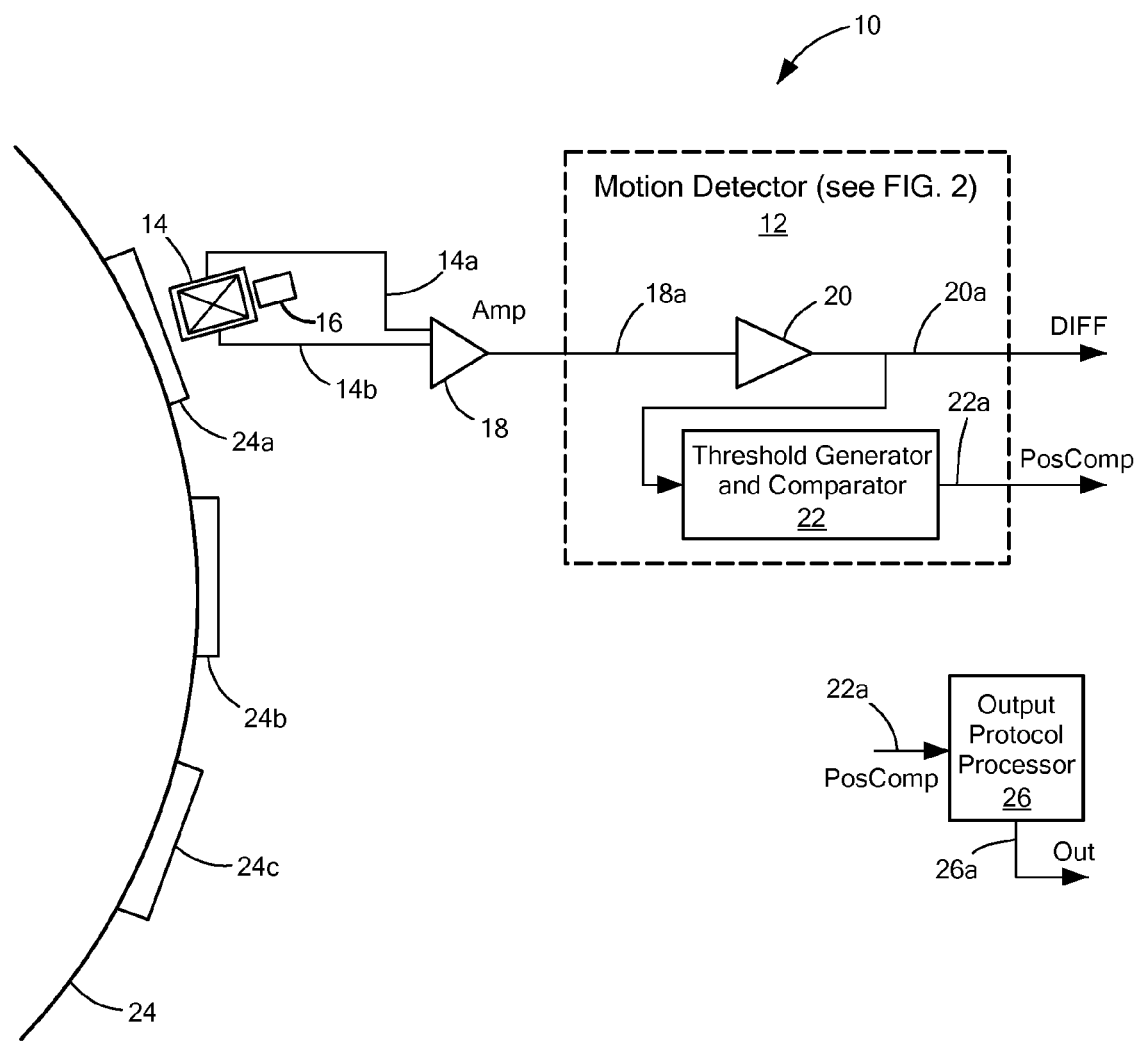
FIG. 1 is block diagram showing an exemplary magnetic field sensor in the form of a rotation sensor, having a motion detector with a threshold generator and comparator circuit.

Before describing the present invention, some introductory concepts and terminology are explained. As used herein, the term "magnetic field sensing element" is used to describe a variety of types of electronic elements that can sense a magnetic field. The magnetic field sensing elements can be, but are not limited to, Hall effect elements, magnetoresistance elements, or magnetotransistors. As is known, there are different types of Hall effect elements, for example, planar Hall elements, vertical Hall elements, circular Hall elements, and Indium antimonide (InSb) sensors. As is also known, there are different types of magnetoresistance elements, for example, anisotropic magnetoresistance (AMR) elements, giant magnetoresistance (GMR) elements, tunneling magnetoresistance (TMR) elements, and magnetic tunnel junction (MTJ) elements.

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, most, but not all, types of magnetoresistance elements tend to have axes of maximum sensitivity parallel to the substrate and most, but not all, types of Hall elements tend to have axes of sensitivity perpendicular to a substrate.

As used herein, the term "magnetic field sensor" is used to describe a circuit that includes a magnetic field sensing element. Magnetic field sensors are used in a variety of applications, including, but not limited to, a current sensor that senses a magnetic field generated by a current carried by a current-carrying conductor, a magnetic switch or proximity detector that senses the proximity of a ferromagnetic or magnetic object, a rotation detector that senses passing ferromagnetic articles, for example, magnetic domains of a ring magnet or teeth of a ferromagnetic gear, and a magnetic field sensor that senses a magnetic field density of a magnetic field. Rotation detectors are used as examples herein. However, the circuits and techniques described herein apply also to any magnetic field sensor capable of detecting a motion of an object.

Threshold detectors and peak detectors are described above. As used herein, the term "tracking circuit" is used to describe a circuit that can track and perhaps hold a signal representative of a positive peak or a negative peak (or both) of a magnetic field signal. It should be understood that both a threshold detector and a peak detector can both employ a tracking circuit.

As used herein, the term "threshold identifier circuit" is used to describe a circuit portion configured to generate a threshold signal.

As used herein, the term "threshold generator circuit" is used to describe any circuit configured to generate a threshold, including, but not limited to a threshold detector or a peak detector. A threshold generator circuit can include both a tracking circuit and a threshold identifier circuit.

As used herein, the term "comparator" is used to describe any circuit capable of comparing two or more signals, which can be analog or digital signals. Thus, a comparator can be, but is not limited to, an analog comparator configured to compare analog signals, a digital comparator configured to compare digital signals, or a programmable device, for example, a microprocessor having code therein for comparing two digital signals While circuits are shown below that use threshold detectors, in other embodiments, similar circuits can use peak detectors. Also, while circuits are shown below that use rotation detectors, in some embodiments, the rotations detectors can be motion detectors configured to detect other motions of an object, for example, repetitive linear motions.

Operation of a magnetic field sensor in a so-called "calibration mode," also referred to herein as an "initialization mode," is described herein. Reference is also made herein to operation of a magnetic field sensor in a so-called "running mode." The calibration mode can occur at the beginning of operation (or from time to time as desired) and the running mode is achieved at other times. Operation of the running mode is described in greater detail in one or more of the above-mentioned patents, notably, U.S. Pat. No. 5,917,320 and U.S. patent application Ser. No. 11/333,522, which are incorporated by reference herein in their entirety.

In general, during the calibration mode, an output signal from the magnetic field sensor may not be accurate, and during the running mode, the output signal is considered to be accurate, i.e., it has edges properly aligned with features of the magnetic field signal.

While a calibration time period is discussed herein, and end of which ends the calibration mode discussed herein in accordance with certain criteria, it should be recognized that other calibrations can be performed after the end of the indicated calibration time period. For example, an automatic gain control can continue calibrating after the end of the indicated calibration time period. At some point after the end of the indicated calibration time period, but not necessarily coincident with the end of the indicated calibration time period, the magnetic field sensors described herein can enter the running mode, during which updates to values of circuit parameters can update in a different way than during the calibration mode.

Referring now to FIG. 1, an exemplary magnetic field sensor 10 includes a magnetic field sensing element 14 for generating a signal 14a, 14b (i.e., a magnetic field signal) proportional to a magnetic field associated with an object 24. The magnetic field sensing element 14 can be, but is not limited to, a Hall effect element, a magnetoresistance element, or a magnetotransistor.

It should be understood that the object 24 need not be a part of the magnetic field sensor 10. The object 24 can be an object configured to rotate, for example, a ferromagnetic gear. The magnetic field sensor 10 can include a permanent magnet 16 disposed proximate to the magnetic field sensing element 14.

The magnetic field sensor 10 can include an amplifier 18 coupled to receive the signal 14a, 14b from the magnetic field sensing element 14 and configured to generate a signal 18a (also a magnetic field signal).

The magnetic field sensor 10 can also include a motion detector, here a rotation detector 12, having an amplifier 20 coupled to receive the signal 18a and configured to generate a signal 20a, also referred to herein as a DIFF signal, representative of the signal 18a. In some embodiments, the amplifier 20 is an automatic gain control (AGC) amplifier. The DIFF signal 20a is also referred to herein as a magnetic field signal. Thus, the signals 14a, 14b, 16a, and 20a are all magnetic field signals, and are all indicative of a magnetic field experience by the magnetic field sensing element 14.

The rotation detector 12 can include a threshold generator and comparator circuit 22 coupled to receive the DIFF signal 20a and configured to generate a PosComp "motion signal" 22a indicative of a movement (i.e., rotation) of the object 24. In some embodiments described more fully below, the motion signal 22a is a two state square wave having a frequency proportional to a speed of rotation of the object 24.

In some arrangements, the magnetic field sensing element 14 can be responsive to motion of the object 24, for example, motion of ferromagnetic gear teeth upon a gear, of which gear teeth 24a-24c upon a gear 24 are representative. To this end, the fixed magnet 16 can be disposed proximate to the magnetic field sensing element 14 and the gear teeth can disturb the magnetic field generated by the magnet 16 as the gear rotates. However, in other arrangements, the magnetic field sensing element 14 can be responsive to movement of magnetic regions upon a magnet, for example, magnetic regions upon a ring magnet (not shown) that is coupled to the gear 24. In some particular arrangements, the ring magnet and the gear 24 are coupled together with a shaft or the like, in these particular arrangements, the ring magnet can be proximate to the magnetic field sensing element 14, but the gear 24 need not be proximate to the magnetic field sensing element 14.

The magnetic field sensing element 14 is responsive to proximity of the gear teeth 24a-24c. In operation, the magnetic field sensing element 14 produces the magnetic field signal 14a, 14b (and also the magnetic field signals 18a, 20a) having a generally sinusoidal shape when the gear 24 rotates, wherein each peak (positive and negative) of the sinusoid is associated with one of the gear teeth 24a-24c.

The magnetic field sensor 10 can also include an output protocol processor 26 coupled to receive the PosComp motion signal 22a and configured to generate an output signal 26a representative of the speed of rotation of the object 24. In some embodiments, the output signal 26a is a two state square wave having a frequency proportional to the speed of rotation of the object 24, in other embodiments, the output signal 26a comprises digital words representative of the speed of rotation of the object 24.

Figure 1A:
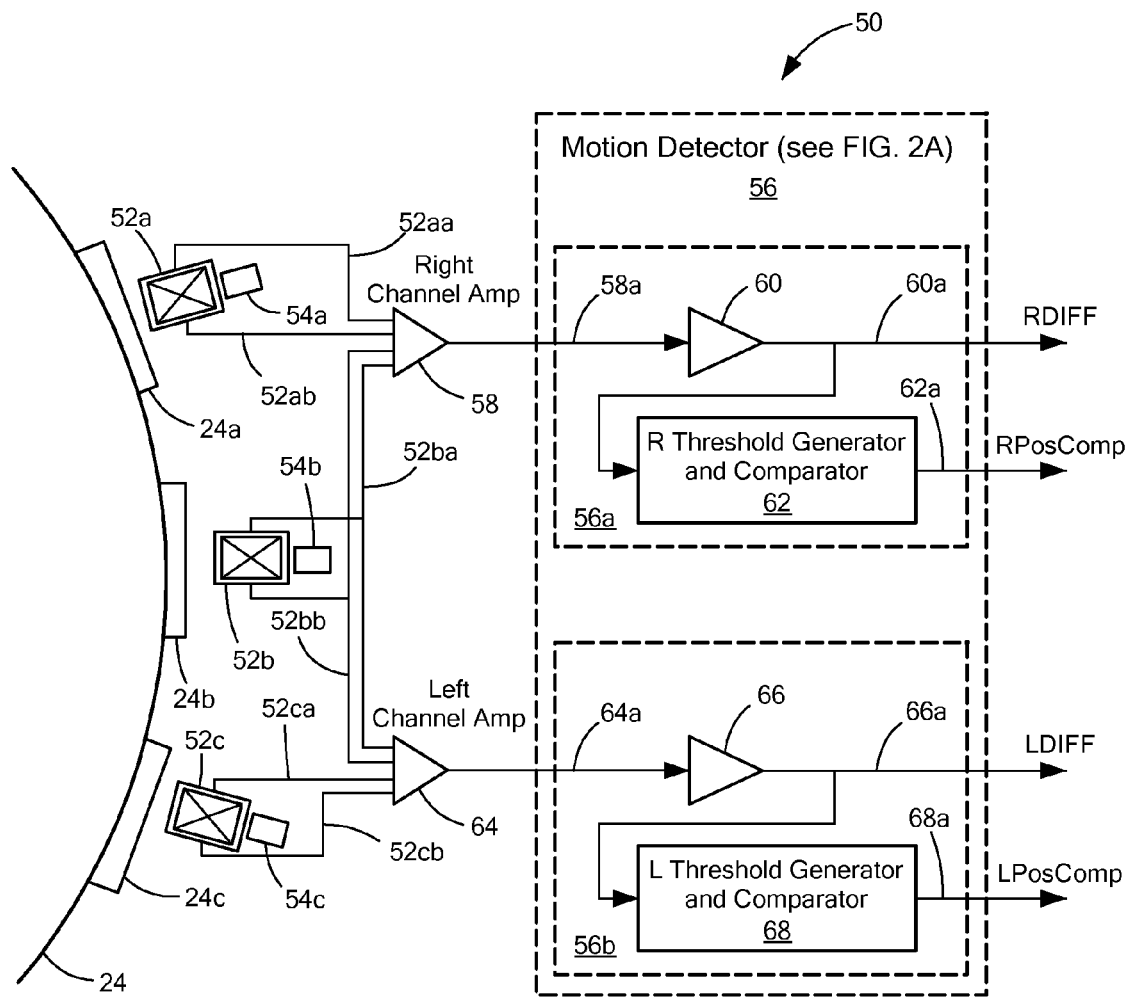
FIG. 1A is a block diagram showing another exemplary magnetic field sensor in the form of a rotation sensor, having two motion detectors with a respective two threshold generator and comparator circuits.
Figure 1A:
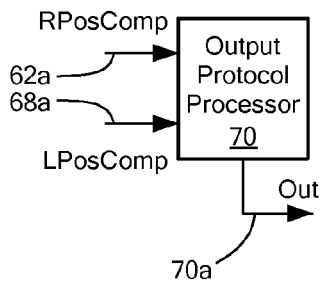

Referring now to FIG. 1A, in which like elements of FIG. 1 are shown having like reference designations, another exemplary magnetic field sensor 50 includes a plurality of magnetic field sensing elements 52a-52c for generating signals 52aa, 52ab, 52ba, 52bb, 52ca, 52cb (magnetic field signals) proportional to a magnetic field.

The magnetic field sensor 50 includes a right channel amplifier 58 coupled to the magnetic field sensing elements 52a and 52b and configured to generate a signal 58a (also a magnetic field signal). The magnetic field sensor 50 also includes a left channel amplifier 64 coupled to the magnetic field sensing elements 52b and 52c and configured to generate a signal 64a (also a magnetic field signal). The signal 58a is proportional to a magnetic field at a first location relative to the object 24 and the signal 64a is proportional to a magnetic field at a second location relative to the object 24. As described more fully below, the first and second locations are associated with right and left electronic channels, respectively.

The magnetic field sensor 50 also includes a motions detectors, here rotation detectors 56, which includes right and left channel motion detectors, here rotation detectors 56a, 56b, respectively. The rotation detector 56a can include an amplifier 60 coupled to receive the signal 58a and configured to generate an RUFF signal 60a (also a magnetic field signal) representative of the signal 58a. The rotation detector 56b can include an amplifier 66 coupled to receive the signal 64a and configured to generate an LDIFF signal 66a (also a magnetic field signal) representative of the signal 64a. In some embodiments, the amplifiers 60, 66 are automatic gain control (AGC) amplifiers.

The rotation detector 56a also includes a right channel threshold generator and comparator circuit 62 coupled to receive the RDIFF signal 60a and configured to generate an RPosComp motion signal 62a indicative of a movement (i.e., rotation) of the object 24. The rotation detector 56b also includes a left channel threshold generator and comparator circuit 68 coupled to receive the LDIFF signal 66a and configured to generate an LPosComp motion signal 68a indicative of the movement rotation) of the object 24.

In some embodiments, the motion signals 62a, 68a are each two state square waves having a frequency proportional to the speed of rotation of the object 24. It will be understood that, since the magnetic field sensing elements 52a-52c are at different physical locations, the RPosComp signal 62a can have a different phase than the LPosComp signal 68a. Furthermore, if the object 24 rotates in one direction, the phase of the RPosComp 62a will lead the phase of the LPosComp signal 68a, but if the object 24 rotates in the opposite direction, the phase relationship will reverse. Therefore, the magnetic field sensor 50, unlike the magnetic field sensor 10 of FIG. 1, is able to generate signals representative not only of the speed of rotation of the object 24, but also signals representative of the direction of rotation of the object 24.

The above designations "left" and "right" (also L and R, respectively) are indicative of physical placement of the magnetic field sensors 52a-52c relative to the object 24 and correspond arbitrarily to left and right channels. In the illustrative embodiment, three magnetic field sensing elements 52a-52c are used for differential magnetic field sensing, with the central sensor 52b used in both channels. While three magnetic field sensors 52a-52c are shown, it should be appreciated that two or more magnetic field sensors can be used. For example, in an embodiment using only two magnetic field sensors 52a, 52c, only magnetic field sensor 52a can be coupled to the right channel amplifier 58 and only the magnetic field sensor 54c can be coupled to the left channel amplifier 64.

The magnetic field sensor 50 can also include an output protocol processor 70 coupled to receive the RPosComp signal 62a and the LPosComp signal 68a and configured to generate an output signal 70a representative of at least the speed of rotation of the object 24. In some embodiments, the output signal 70a is also representative of the direction of rotation of the object 24.

In some embodiments the output signal 70a is a two state square wave having a frequency proportional to the speed of rotation of the object 24 and a duty cycle (or pulse width) representative of the direction of the rotation of the object 24. In other embodiments, the output signal 70a comprises digital words representative of the speed of rotation of the object 24 and the direction of rotation.

Figure 2:
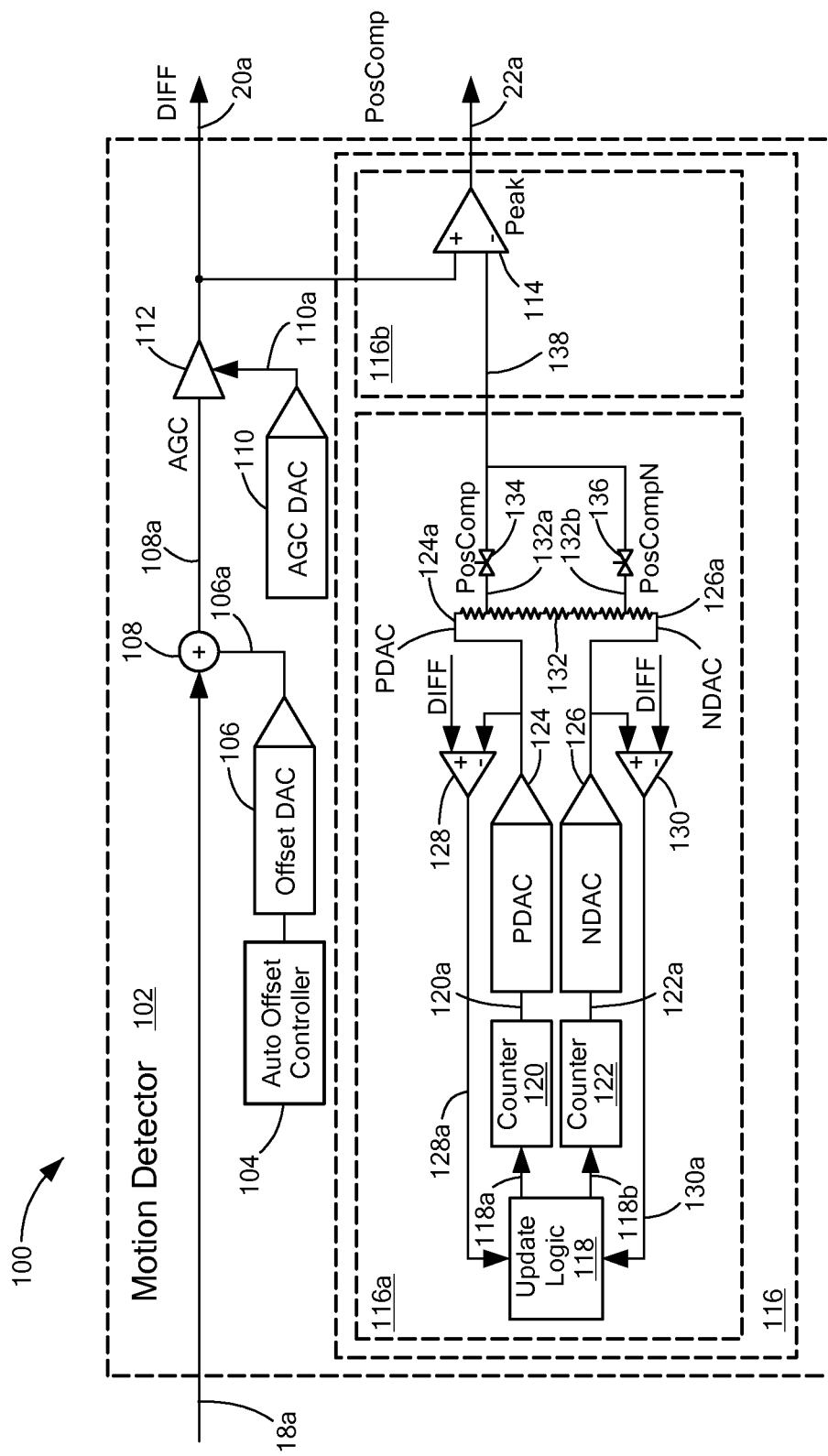
FIG. 2 is a block diagram showing an exemplary motion detector that can be used as the motion detector of FIG. 1, having two digital-to-analog converters (DACs), a positive DAC (PDAC) and a negative DAC (NDAC)

Referring now to FIG. 2, in which like elements of FIG. 1 are shown having like reference designations, a circuit 100 includes an exemplary rotation (motion) detector 102, which can be the same as or similar to the rotation detector 12 of FIG. 1, but shown in greater detail.

The rotation detector 102 is coupled to receive the magnetic field signal 18a of FIG. 1. The magnetic field signal 18a can include an undesirable DC offset. Therefore, an auto offset controller 104, an offset digital-to-analog converter (DAC) 106, and a summer 108 can be provided in order to reduce or eliminate the DC offset.

The rotation detector 102 can also include an automatic gain control (AGC) amplifier 112 coupled to receive an output signal 108a generated by the summer 108 and configured to generate the DIFF signal 20a having an amplitude within a controlled amplitude range. It should be understood that the DIFF signal 20a is representative of the magnetic field experienced by one or more magnetic field sensing elements, for example, the magnetic field sensing element 14 of FIG. 1.

The DIFF signal 20a is coupled to a comparator 114 (a comparator part 116b of the threshold generator and comparator circuit 116). The comparator 114 also receives a threshold signal 138. Generation of the threshold signal 138 is further described below. The threshold comparator 114 is configured to generate the PosComp signal 22a.

The threshold signal 138 can switch between two different values. In one particular embodiment, the threshold signal 138 can be determined by a threshold detector 116a (a threshold generator part 116a of the threshold generator and comparator circuit 116). A first threshold signal 132a can be a first predetermined percentage e.g., eighty-five percent, of a peak-to-peak magnitude of the DIFF signal 20a, e.g., near to but below a positive peak of the DIFF 20a. A second threshold signal 132b can be a second predetermined percentage, e.g., fifteen percent, of a peak-to-peak magnitude of the DIFF signal 20a, e.g., near to but above a negative peak of the DIFF signal 20a. The threshold signal 138 can, therefore, be relatively near to and below a positive peak of the DIFF signal 20a at some times and relatively near to and above a negative peak of the DIFF signal 20a at other times. Therefore, the comparator 114 can generate the PosComp signal 22a having edges closely associated with the positive and negative peaks of the DIFF signal 20a.

However, in other embodiments, the threshold signal 138 can take on two other different values, for example, two values near to zero crossings of the DIFF signal 20a, and therefore, the threshold comparator 114 can generate the PosComp signal 22a having edges closely associated with the zero crossings of the DIFF signal 20a. In still other embodiments, the threshold signal 138 can take on two other different values as may be generated, for example, by a peak detector, which is described above.

The threshold signal (or voltage) 138 is generated by the threshold generator and comparator circuit 116, which can be the same as or similar to the threshold generator and comparator circuit 22 of FIG. 1.

The threshold generator part 116a of the threshold generator and comparator circuit 116 can include counters 120, 122, a PDAC 124, an NDAC, 126, first and second comparators 128, 130, respectively, an update logic circuit 118, a resistor ladder 132, and first and second switches 134, 136, respectively. The PDAC 124 is coupled to receive a count signal 120a from the counter 120. The PDAC 124 is configured to generate a PDAC output signal 124a coupled to a first end of the resistor ladder 132. The NDAC 126 is coupled to receive a count signal 122a from the counter 122. The NDAC 126 is configured to generate an NDAC output signal 126a coupled to a second end of the resistor ladder 132. The PDAC output signal 124a and the NDAC output signal 126a are also referred to herein as tracking signals.

In operation, the PDAC output signal 124a can sometimes track the DIFF signal 20a and sometimes hold a positive peak of the DIFF signal 20a and the NDAC output signal 126a can sometimes track the DIFF signal 20a and sometimes hold a negative peak of the DIFF signal 20a.

The first switch 134 is coupled to receive a first threshold signal 132a signal from a first tap of the resistor ladder 132 and the second switch 136 is coupled to receive a second threshold signal 132b signal from a second tap of the resistor ladder 132. The first switch 134 can be controlled by the PosComp signal 22a and the second switch 136 can be controlled by an inverted PosComp signal 22a, i.e. a PosCompN signal.

The first comparator 128 is coupled to receive the PDAC signal 124a and also coupled to receive the DIET signal 20a and configured to generate a first feedback signal. The second comparator 130 is coupled to receive the NDAC signal 126a and also coupled to receive the DIFF signal 20a and configured to generate a second feedback signal 130a.

In FIGS. 5-10, it will be shown that additional circuitry, namely, a threshold selection module can be coupled between the threshold generator part 116a and the comparator part 116b of the threshold generator and comparator circuit 116.

Figure 2A:
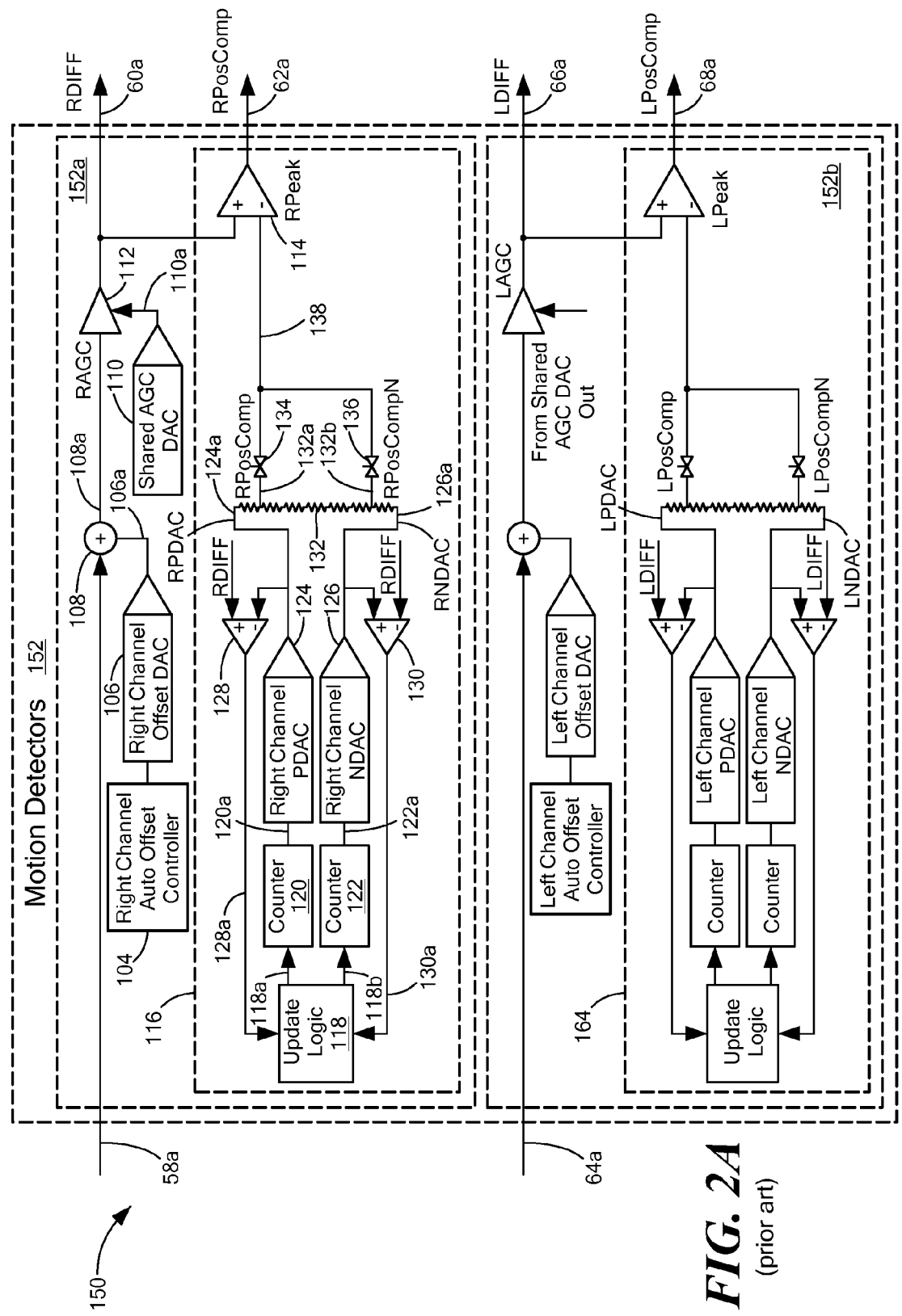
FIG. 2A is a block diagram showing two exemplary motion detectors that can be used as the two motion detectors of FIG. 1A, having two respective PDACs and two respective NDACs.

Referring now to FIG. 2A, in which like elements of FIG. 1A are shown having like reference designations, a circuit 150 includes two exemplary rotation (motion) detectors 152, indentified as 152*a*, 152*b*, which can be the same as or similar to the rotation detectors 56*a*, 56*b* of FIG. 1A, but shown in greater detail.

The rotation detectors 152 can include two threshold generator and comparator circuits 116, 164, which can be the same as or similar to the threshold generator and comparator circuit 62, 68 of FIG. 1A, but shown in greater detail. The rotation detector 152*a* is coupled to receive the magnetic field signal 58*a* of FIG. 1A and the rotation detector 152*b* is coupled to receive the magnetic field signal 64*a* of FIG. 1A. The rotation detector 152*a* is configured to generate the RPosComp signal 62*a* (FIG. 1A) and the RDIFF signal 60*a* (FIG. 1A), and the rotation detector 152*b* is configured to generate the LPosComp signal 68*a* (FIG. 1A) and the LDIFF signal 66*a* (FIG. 1A).

Operation of each one of the two rotation detectors 152*a*, 152*b* is the same as or similar to operation of the rotation detector 102 of FIG. 2, so is not discussed here again.

Figure 2B:
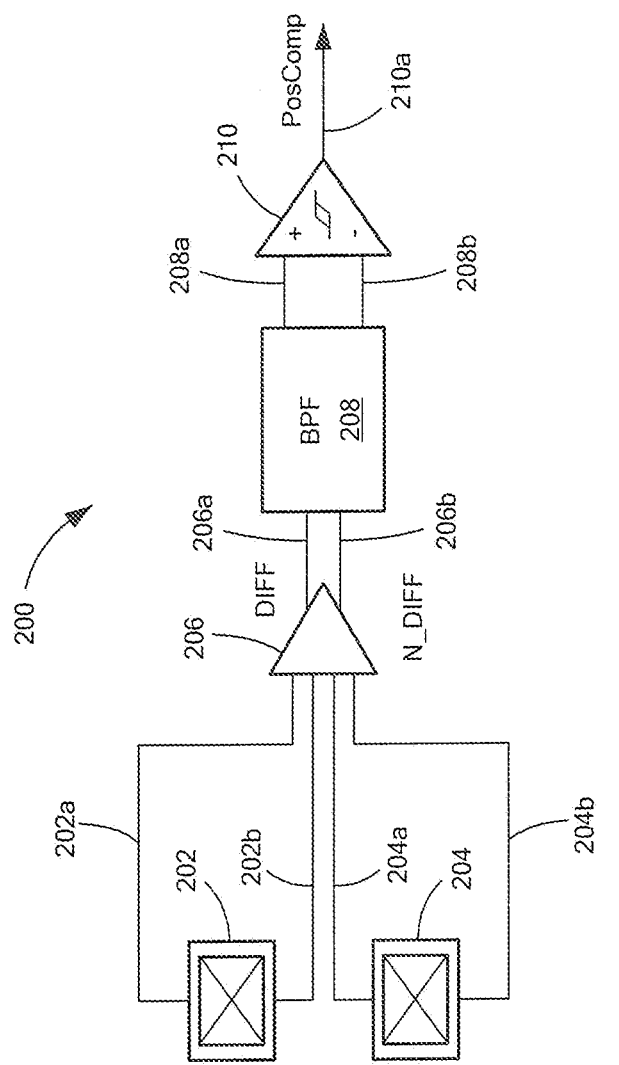
FIG. 2B is a block diagram of another exemplary magnetic field sensor in the form of a rotation sensor and having a zero crossing detector.

Referring now to FIG. 2B, a so-called "zero-crossing detector" 200, a threshold generator and comparator circuit, can be compared with the threshold generator and comparator circuit 116 of FIG. 2. Here, an amplifier 206 is coupled to receive signals 202*a*, 202*b*, 204*a*, 204*b* from two magnetic field sensing elements 202, 204. The amplifier is configured to generate a differential output signal 206*a*, 206*b* coupled to a band pass filter (BPF) 208. The differential signal 206*a*, 206*b* is comparable to a differential DIFF signal. The BPF 208 is configured to generate a differential filtered signal 208*a*, 208*b*. A comparator is coupled to receive the differential filtered signal 208*a*, 208*b* and configured to generate a motion signal, PosComp 210*a*.

In operation, the signals 208*a*, 208*b* essentially operate as thresholds. The signals 208*a*, 208*b* cross each other at or near a zero crossing of each respective signal 208*a*, 208*b*. From discussion below, it will be apparent how to use the zero-crossing detector in the embodiments of FIGS. 5 and 7.

Figure 3:
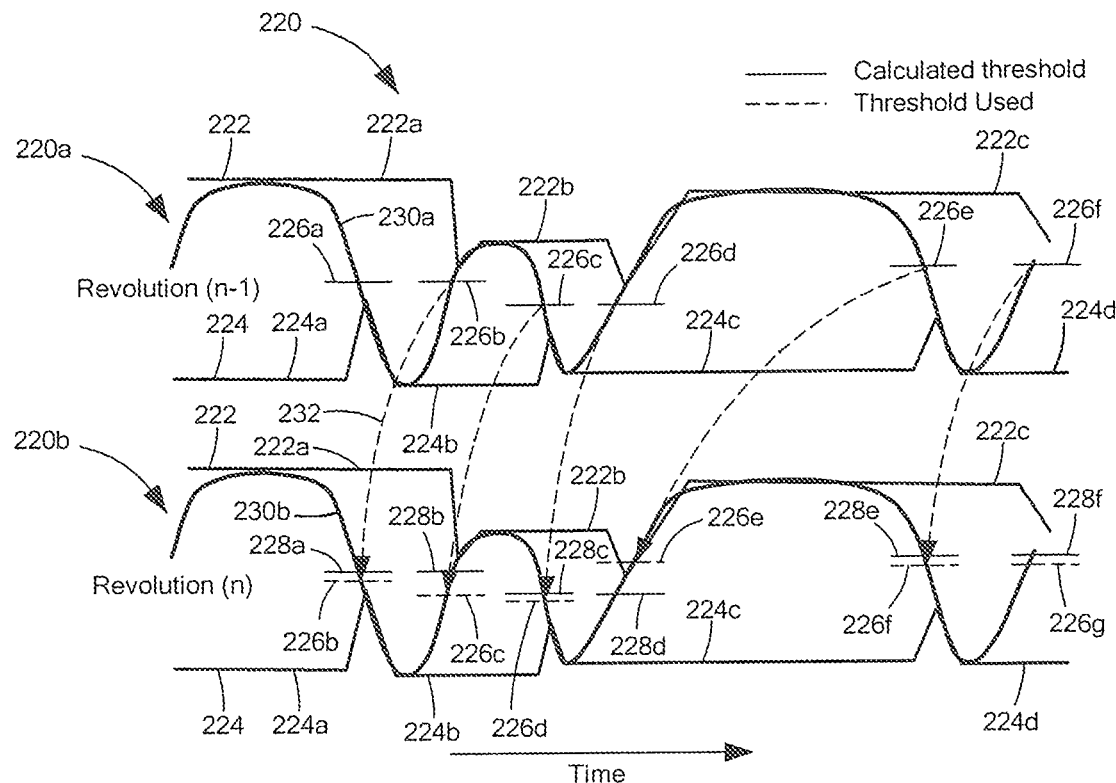
FIG. 3 is a graph showing two magnetic field signals, each at a different revolution of a moving object being sensed, with associated PDAC and NDAC output signals and associated thresholds.

Referring now to FIG. 3, a graph 220 includes two parts 220*a*, 220*b*, each part having a horizontal axis with a scale in arbitrary units of time, which can be related to rotation angle or linear displacement, and a vertical axis with a scale in arbitrary units of voltage, which can be related to magnetic field strength (Gauss) or an associated digital value.

Cycles of each one of the parts 220*a*, 220*b* are indicative of gear teeth, e.g., the gear teeth 24*a*-24*c* of FIG. 1A, passing by the magnetic field sensing elements, e.g., the magnetic field sensing elements 52*a*-52*c* of FIG. 1A. The parts 220*a*, 220*b* are each indicative of a different revolution, and at the same positions (rotational angles), of the gear 24 of FIG. 1.

The part 220*b* includes a DIFF signal 230*b* representative, for example, of the DIFF signal 20*a* of FIGS. 1 and 2. The DIFF signal 230*b* is representative of an nth revolution of the gear 24 of FIG. 1. In normal operation, a PDAC signal 222, which is similar to the PDAC signal 124*a* of FIG. 2, can reach and acquire positive peaks of the DIFF signal 230*b*. Similarly, an NDAC signal 224, which is similar to the NDAC signal 126*a* of FIG. 2, can reach and acquire negative peaks of the DIFF signal 230*b*.

The part 220*a* includes a DIFF signal 230*a* also representative, for example, of the DIFF signal 20*a* of FIGS. 1 and 2. The DIFF signal 230*a* is representative of an (n−1)st revolution, i.e., a prior revolution, of the gear 24 of FIG. 11*n* normal operation, the PDAC signal 222 can reach and acquire positive peaks of the DIFF signal 230*a*. Similarly, an NDAC signal 224 can reach and acquire negative peaks of the DIFF signal 230*a*.

Thresholds 226*a*-226*f* can be calculated during cycles of the DIFF signal 230*a* on the (n−1)st revolution of the gear 24. Thresholds 228*a*-228*f* can be calculated during cycles of the DIFF signal 230*h*, but on the nth revolution of the gear 24. The thresholds 226*a*-226*f* correspond, for example, to threshold signals as may be taken from a center tap of the resistor ladder 132 of FIG. 2, i.e., a 50% point between the positive and negative peaks of the DIFF signal 230*a* on the (n−1)st revolution of the gear 24. The thresholds 228*a*-228*f* correspond, for example, to threshold signals as may be taken from the center tap of the resistor ladder 132 on the nth revolution of the gear 24. A center tap is shown in figures below.

Arrows, of which an arrow 232 is representative, indicate that during the nth revolution of the gear represented by the DIFF signal 230*h*, during which the thresholds 228*a*-228*f* could otherwise be used, instead, the thresholds 226*a*-226*f* are used. On an nth revolution of the gear 24, the threshold determined during an (n−1)st revolution is used, shifted by one edge. In other words, on the nth revolution, threshold 226*h* is used instead of threshold 228*a*, threshold 226*c* is used instead of threshold 228*b*, and so on. A threshold from a prior cycle is used, but the threshold is used that is associated with the next edge of the gear 24.

Similarly, on an (n+1)st revolution of the gear 24, for which a DIFF signal is not shown, the thresholds 228*a*-228*f* could be used. Thus, thresholds are used from a prior revolution of the gear 24.

It will be apparent that, on the nth revolution of the gear 24, while use of only thresholds from the (n−1)st revolution is shown, in other embodiments, any combination of thresholds from prior and present cycles and revolutions could be used. For example, in one embodiment, several prior thresholds associated with the same gear tooth as the present gear tooth now at the nth revolution can be averaged. For example, thresholds associated with the same gear tooth but at the (n−1)th, (n−2)th, . . . , (n−M)th revolutions can be averaged to provide a threshold to be used for the same gear tooth at the nth revolution.

In still other embodiments, prior thresholds associated with more than one gear tooth at the current, nth, revolution can be used. For example, thresholds associated with the different gear teeth (n−1)th, . . . , (n−N)th gear teeth, all in the nth revolution can be averaged to provide a threshold to be used for a gear tooth at the nth revolution.

In still other embodiments, not only prior thresholds, but also the presently determined threshold can be used in either of the above two averages. Furthermore, while averages are discussed above, any combination of the thresholds can be used. The combinations can include, but are not limited to, RMS combinations and weighted averages.

In still other embodiments, any combination of present and prior thresholds from present and prior gear teeth and/or revolutions can be used.

Taking threshold 226*d* as an example, and only looking at revolution (n−1) 220*a*, it should be appreciated that the threshold 226*d* is calculated based upon the PDAC signal 222, taken during interval 222*b*, in relation to the NDAC signal 224, taken during the interval 224*c*. Thus, in fact, the threshold 226*d*, generated during revolution (n−1), would be best applied at the edge of the DIFF signal 230*a* where the threshold 226*c* is instead applied as shown. However, at that time, the threshold 226*d* has not yet been generated. In other words, each threshold generated during revolution (n−1) is actually most suitable for application to an edge (gear tooth) of the DIFF signal 230*a* prior to the edge (gear tooth) upon which it is actually applied.

Accordingly, by the above-described arrangement, on the next revolution, revolution n, the threshold 226*d* is applied as shown, to an edge of the DIFF signal 230*b* corresponding to a gear tooth prior to the gear tooth upon which the threshold 226d was generated on the prior cycle, i.e., of DIFF signal 230a. It will be appreciated that this results in a threshold more accurately placed in relation to each cycle (gear tooth) of the signal 230b.

Accurate threshold placement and resulting edge timing accuracy of the POSCOMP signals 62a, 68a of FIG. 2A is important in applications where the edges are used to represent exact rotational angle of an object. Such accuracy may be important when the rotation (motion) detectors 152 of FIG. 2A, are used, for example, to sense rotation of a camshaft in an automobile in order to control various engine timings.

Figure 5:
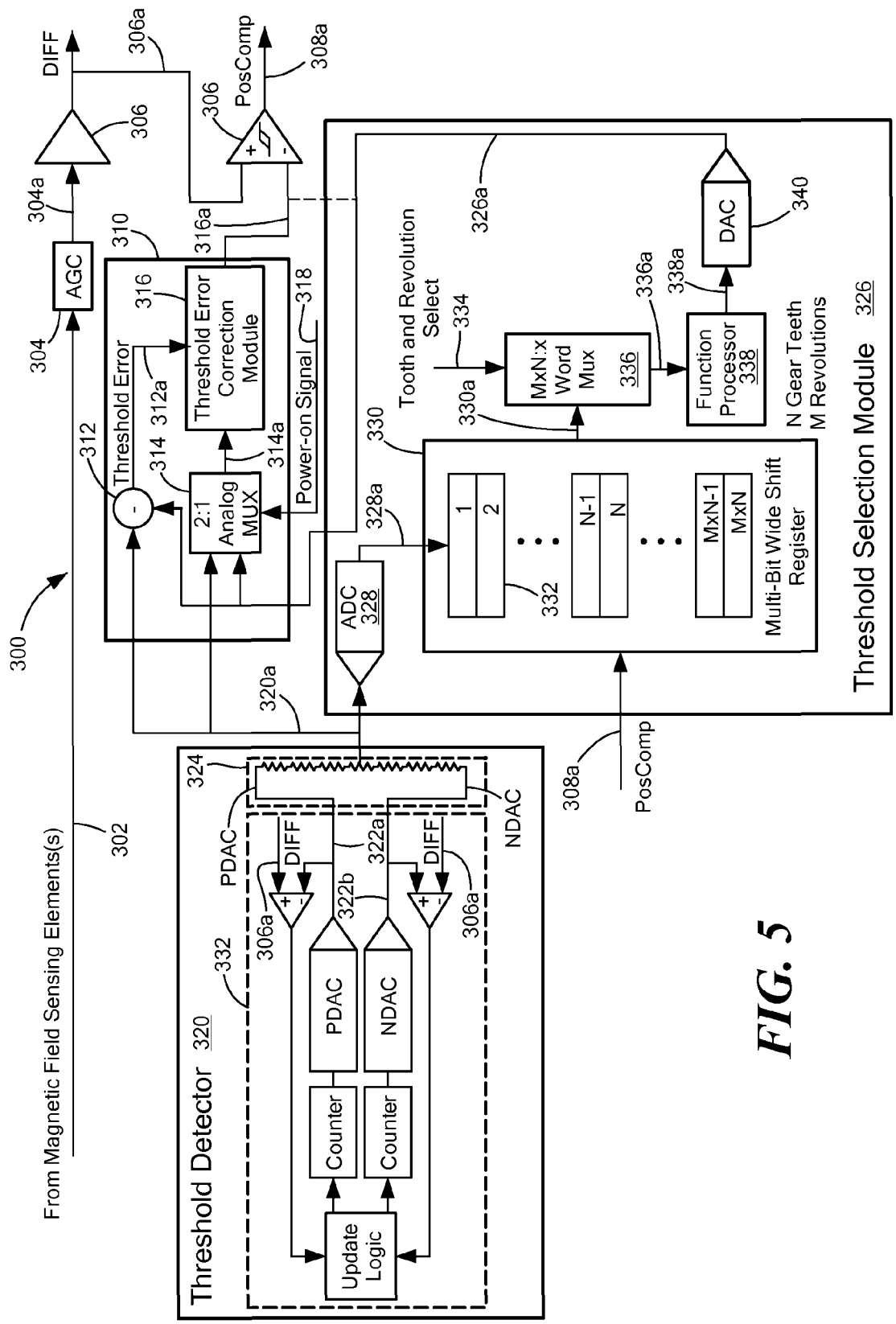
FIG. 5 is a block diagram of an exemplary motion detector that can be used in place of the motion detectors of FIGS. 1, 1A, 2, and 2A, which has an analog threshold generator circuit in the form of a threshold detector, which is discussed above, an analog comparator, and a threshold selection module with a digital memory disposed between the threshold generator circuit and the comparator.

In accordance with the above description of FIG. 3 and with forward reference to FIG. 5, a method of detecting movement of an object (e.g., 24 of FIG. 1) includes generating a magnetic field signal (e.g., the DIFF signal 220a, 220b) with at least one magnetic field sensing element (e.g., 14 of FIG. 1), wherein the magnetic field signal (e.g., the DIFF signal 220a, 220b) is proportional to a magnetic field associated with the object (e.g., 24 of FIG. 1), wherein the magnetic field signal (e.g., the DIFF signal 220a, 220b) has cycles (e.g., cycles of DIFF signal 220a, 220b) including a first cycle (e.g., cycles of the DIFF signal 220a at revolution n−1) occurring during a first time period and a second cycle (e.g., cycles of the DIFF signal 220b at revolution n) occurring during a second time period. It should be apparent that the first time period occurs in time before the second time period. The method also includes generating a tracking signal (e.g., PDAC signal 222 or NDAC signal 224) that tracks at least a portion of the magnetic field signal (e.g., the DIFF signal 220a, 220b). The method also includes using the tracking signal (e.g., PDAC signal 222 or NDAC signal 224) to generate a selected threshold signal (e.g., 226b near the DIFF signal 230a) in accordance with a first cycle (e.g., any cycle of the DIFF signal 230a at revolution n−1) of the magnetic field signal. The method also includes comparing (see, e.g., comparator 306 of FIG. 5) the selected threshold signal (e.g., 226b near the DIFF signal 230a) generated in accordance with the first cycle (e.g., any cycle of the DIFF signal 230a at revolution n−1) of the magnetic field signal to the second cycle (e.g., any cycle of the DIFF signal 230b at revolution n) of the magnetic field signal. In other words, a threshold (e.g., 226b) compared with a given cycle of the DIFF signal was generated at a prior cycle of the DIFF signal, which may occur at a prior revolution of the object.

Figure 4:
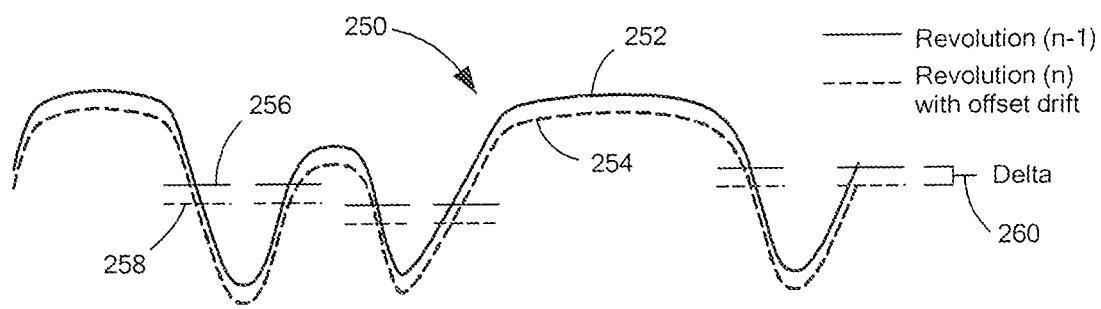
FIG. 4 is a graph showing two magnetic field signals, each at a different revolution of a moving object being sensed, and each having a different DC offset voltage.

Referring now to FIG. 4, a graph 250 has a horizontal axis with a scale in arbitrary units of time and a vertical axis with a scale in arbitrary units of voltage. The graph 250 includes a DIFF signal 252 and a DIFF signal 254, each representative, for example, of the DIFF signal 20a of FIGS. 1 and 2, but each on a different revolution of the gear 24 of FIGS. 1 and 2. A DC offset 260 is shown between the two DIFF signals 252, 254. In accordance with the DC offset 260, different thresholds, e.g. thresholds 256, 258 are determined on each cycle, not yet taking into account any threshold corrections.

By sensing the offset change 260, only available since a history of the thresholds from a plurality of revolutions is stored using techniques described below, a change or drift of the offset can be calculated. The offset change can be applied to the threshold used at each gear tooth (e.g., to thresholds 226a-226f and 228a-228f of FIG. 3) in order to even more accurately position the thresholds.

Referring now to FIG. 5, a circuit 300 (i.e., a motion detector 300) for detecting a movement of an object includes at least one magnetic field sensing element (not shown, e.g., 52a-52c of FIGS. 1-2) for generating DIFF signal 306a proportional to a magnetic field associated with the object (e.g., the gear 24 of FIGS. 1-1A), wherein the DIFF signal 306a has cycles including a present cycle. The circuit 300 provides at least one motion detector 300 configured to generate a motion signal 308a indicative of the movement of the object, wherein the motion signal 308a has edges associated with the cycles of the DIFF signal 306a. The at least one motion detector 300 can include a threshold generator circuit 320 (here a threshold detector 320) coupled to receive the DIFF signal 306a and configured to generate a threshold signal 320a.

The at least one motion detector 300 can also include at least one threshold selection module 326 coupled to receive the threshold signal 320a, configured to save samples 332 of the threshold signal 320a, configured to select samples 336a of the threshold signal 320a associated with of a prior cycle of the DIFF signal 306a a predetermined number of cycles before the present cycle, and configured to generate a selected threshold signal 326a related to the selected samples 336a of the threshold signal 320a. The at least one motion detector 300 can also include a comparator 308 coupled to receive a signal 316a representative of the selected threshold signal 326a, coupled to receive the DIFF signal 306a, configured to compare the signal 316a representative of the selected threshold signal 326a with the DIFF signal 306a, and configured to generate the motion signal 308a.

It will be appreciated that the threshold generator circuit 320 can include a tracking circuit portion 322 that can generate a PDAC signal 322a and an NDAC signal 322b, each of which can track portions of the DIFF signal 306a. The threshold generator circuit 320 can also include a threshold identifier circuit portion 324.

The threshold generator circuit 320 can be the same as or similar to a threshold generator part 116a of the threshold generator and comparator circuit 116 of FIG. 2. The comparator 308 can be the same as or similar to the comparator part 116b of the threshold generator and comparator circuit 116 of FIG. 2. The threshold selection module 326 is coupled between the threshold generator circuit 320 and the comparator 308.

Unlike the threshold generator circuit 116a of FIG. 2, which generates the two threshold signals 132a, 132b, the threshold generator circuit 320 can generate but one threshold signal. 320a. Other embodiments that generate two thresholds are shown in conjunction with figures below.

The threshold selection module 326 can include an analog-to-digital converter 328 coupled to receive the threshold signal 320a and configured to generate digital samples 328a of the threshold signal 320a.

The threshold selection module 326 can also include a digital memory 330 in the from of a multi bit wide digital shift register that can be sized to hold samples associated with M revolutions of the gear 24 of FIGS. 1-2B, each one of the revolutions associated with N samples. Thus, in some embodiments, the memory 330 can be sized to hold. MxN multi-bit samples of the threshold signal 320a, i.e., a history of the thresholds. In some embodiments, the digital memory 330 can store a respective sample of the threshold signal 320a on or associated with each positive and negative edge of the PosComp signal 308a. In other embodiments, the digital memory 330 can store a respective sample of the threshold signal 320a on or associated with each positive or each negative edge of the PosComp signal 308a.

In some embodiments, the digital memory 330 can store samples of the threshold signal 320a not associated with every gear tooth (not every POSCOMP), but associated with only some of the gear teeth. Referring briefly to FIG. 3, with these and other arrangements, it is possible to apply the (n−1) revolution thresholds to only some of the cycles (e.g., gear teeth) associated with the nth revolution, for example, to a cycle that has an aberrant amplitude. In other embodiments, the digital memory 330 can store samples of the threshold signal 320a not associated with every gear revolution, but associated with only some of the gear revolutions. All of these arrangements can use a reduced amount of digital memory 330 and a reduced amount of circuit die area.

The threshold selection module 326 can also include an MxN:x word multiplexer 336 coupled to the digital memory 330 and configured to select x sample words from among the possible MxN sample words. It will be apparent that each one of the x sample words is clocked to a new sample word in accordance with the PosComp signal 308a. Thus each one of the x sample words is actually a stream of sample words, each representative of a particular cycle of the DIFF signal 306a at or prior to a present cycle of the DIFF signal 306a. Thus, in discussion below, when referring to a sample, it will be understood that the sample is actually a stream of samples.

The MxN:x word multiplexer 336 can select samples according to any selected number of the stored samples 332 of the threshold signal 320a, each selected sample associated with a different cycle of the DIFF signal 306a. The MxN:x word multiplexer 336 can select the x sample words according to a control signal 334.

In some embodiments, the MxN:x word multiplexer 336 is an MxN:1 multiplexer and only one sample (sample steam) is selected. In some embodiments, the one selected sample is associated with a cycle of the DIFF signal 306a immediately prior to a present cycle, which is represented in FIG. 3. Thus, on each cycle of the DIFF signal 306a, a sample is selected in accordance with an immediately prior cycle. In other embodiments, the one selected sample can be any number of cycles prior to the present cycle, for example a number of cycles of the DIET signal 306a corresponding to a revolution of the gear 24 (FIG. 2).

The MxN:x word multiplexer 336 is configured to provide the x samples 336a (which can be one sample) to a function processor 338. It will be appreciated that the x samples 336a are generated on each respective cycle of the DEFT signal 306a, therefore, the signal 336a is a continuous stream of samples.

The function processor 338 is coupled to receive the x samples 336a and configured to provide a signal 338a that is a function of the x samples 336a. For example, in some embodiments, the signal 338a provides a stream of samples, each one of which is an average of one of the sets of the x samples 336. In other embodiments, the signal 338a is an RMS average of each set of x samples 336a. In other embodiments, the signal 338a is a weighted average of the each set of x samples 336a, for example, taking more recent samples with a higher weight than earlier samples. Other combinations of the set of x samples are also possible.

Another use for retaining the history of thresholds in the memory 330 is that, if a threshold associated with a particular gear tooth deviates greatly from revolution to revolution, the deviation can be used to indicate a fault in the magnetic field sensor 300.

It should be apparent that if only one sample (sample stream) is used, then the function processor 338 is not required and may be omitted.

A digital-to-analog converter 340 is coupled to receive the signal. 338a and configured to generate an analog sample, or more precisely, a series of analog samples 326a, according to a series of digital samples 338a. The series of analog samples 326a is also referred to herein as a selected threshold signal 326a. It will be appreciated that a filter (not shown) can be used to smooth the selected threshold signal 326a.

In some embodiments, the selected threshold signal 326a can be coupled directly to the comparator 308. However, in other embodiments, the circuit 300 can include a circuit module 310 coupled to receive the selected threshold signal 326a. The circuit module can include a 21 analog multiplexer 314 coupled to receive the selected threshold signal 326a, coupled to receive the threshold signal 320a, and configured to generate an output signal 314a as a selected one of the threshold signal 320a or the selected threshold signal 326a under control by a power-on signal 318a. Essentially, for a time shortly after the circuit 300 is first powered on, e.g., during a calibration time period, the a 2:1 analog multiplexer 314 can select as the output signal 314a, the threshold signal 320a, and thereafter, e.g., during a running mode of operation, the a 2:1 analog multiplexer 314 can select as the output signal 314a, the selected threshold signal 326a. This arrangement may be necessary, since immediately after power up, there is no threshold history, and a threshold from a previous revolution of the gear 24 is not available.

A threshold error correction module 316 can be coupled to receive the signal 314a and can be configured to generate a signal 316a, which can be, at times after predetermined amount of time from power up, representative of the selected threshold signal 326a, and at times within the predetermined amount of time from power up, representative of the threshold signal 320a.

The circuit module 310 can also include a differencing circuit 312 coupled to receive the threshold signal 320a, coupled to receive the selected threshold signal 326a, and configured to generate a signal 312a as a difference of the threshold signal 320a and the selected threshold signal 326a. The threshold error correction module 316 can also be coupled to receive the signal 312a.

In operation, the threshold selection module 326 selects one or more samples from the memory 330 on each cycle of the DIFF signal, each respective sample the same respective time prior to the present cycle of the DIFF signal 306a. In some embodiments, the threshold selection module 326 can process, e.g., average, the selected samples, for example, samples from five prior cycles of the DIFF signal 306a to generate the selected threshold signal 326a.

In some embodiments, the threshold selection module 326 selects only one sample, for example, a threshold sample from a cycle immediately prior to the present cycle of the DIFF signal 306a and passes the one sample through to the selected threshold signal 326a without processing.

In some other embodiments, the threshold selection module 326 selects only one sample, for example, a threshold sample from a corresponding cycle from a revolution of the gear 24 (FIG. 1) immediately prior to the present revolution, and passes the one sample through to the selected threshold signal 326a without processing.

As described above, it will be appreciated that generation of the selected threshold signal 326a in accordance with a function of a plurality of thresholds from prior cycles, or in accordance with one cycle immediately prior to the present cycle, or in accordance with one corresponding cycle of a prior revolution, it is possible to establish the selected threshold signal 326a more accurately and less subject to mechanical irregularities, wobble, or runout of the gear 24.

Figure 6:
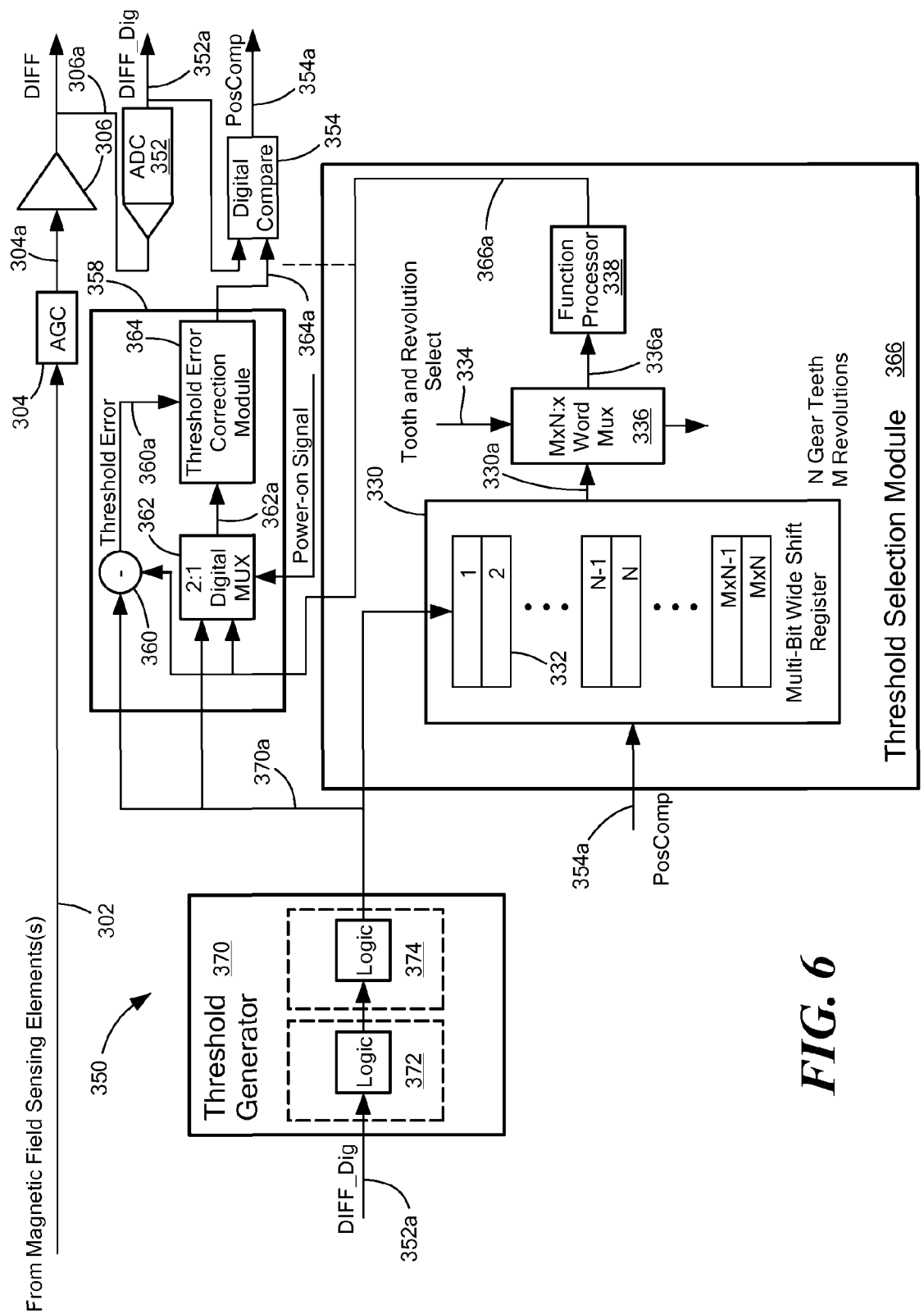
FIG. 6 is a block diagram of another exemplary motion detector that can be used in place of the motion detectors of FIGS. 1, 1A, 2, and 2A, which has a digital threshold generator circuit, a digital comparator, and a threshold selection module with a digital memory disposed between the threshold generator circuit and the comparator.

Referring now to FIG. 6, in which like elements of FIG. 5 are shown having like reference designations, a circuit 350 can have characteristics similar to those of the circuit 300 of FIG. 5, however, some of the analog circuits shown in FIG. 5 are replaced by corresponding digital circuits. For example, the threshold generator circuit 320 of FIG. 5 can be replaced by a threshold generator circuit 370 that implements the tracking circuit 322 and the threshold identifier circuit 324 of FIG. 5 as logic circuits 372, 374, respectively. The threshold generator circuit 370 is coupled to receive a DIFF signal 352a, wherein the DIFF signal 352a is digitized by an analog-to-digital converter 352, and is configured to generate a threshold signal 370a, also a digital signal.

A threshold selection module 366 can be entirely digital, not requiring the analog-to-digital converter 328 or the digital-to-analog converter 340 of FIG. 5. The threshold selection module 366 is configured to generate a selected threshold signal 366a, which can be a digital signal.

A circuit module 358 can be coupled to receive the selected threshold signal 366a and to receive the threshold signal 356a. The circuit module 358 can include a differencing circuit 360, a 2:1 digital multiplexer 362, and a threshold error correction module 364 coupled in the same way as and with functions the same as or similar to the differencing module 312, the 2:1 analog multiplexer 314, and the threshold error correction module 316 of FIG. 5. However, the circuit module 358 has digital circuits, unlike the circuit module 310 of FIG. 5, which has analog circuits.

The circuit 350 can include a digital comparator 354 coupled to receive an output signal 364a from the threshold error correction module 364 and also coupled to receive the digitized DIFF signal 352a. The digital comparator 354 is configured to generate a PosComp signal 354a, which can be the same as or similar to the PosComp signal 308a of FIG. 5.

It will be appreciated that many of the functions of the circuit 350 are implemented with digital circuits that perform the same or similar functions to the analog circuits of the circuit 300 of FIG. 5.

Figure 7:
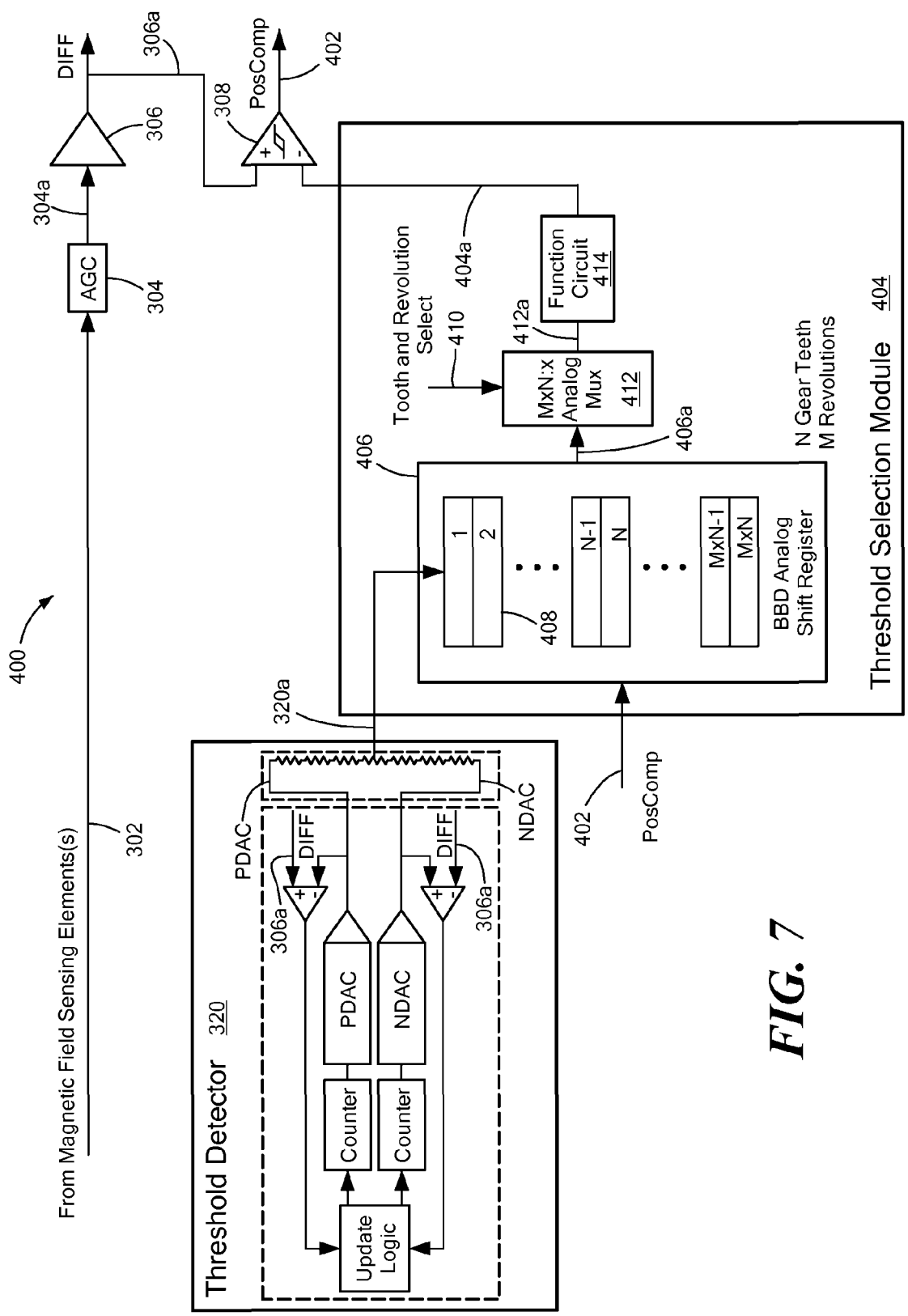
FIG. 7 is a block diagram of yet another exemplary motion detector that can be used in place of the motion detectors of FIGS. 1, 1A, 2, and 2A, which has an analog threshold generator circuit in the form of a threshold detector, which is discussed above, an analog comparator, and a threshold selection module with an analog memory disposed between the threshold generator circuit and the comparator.

Referring now to FIG. 7, in which like elements of FIG. 5 are shown having like reference designations, a circuit 400 includes the threshold generator circuit 320 of FIG. 5 configured to generate the threshold signal 320a.

A threshold selection module 404 is coupled to receive the threshold signal 320a, and configured to store analog samples, e.g., a sample 408, of the threshold signal 320a. The analog samples can be stored in a bucket brigade device (BBD) 406 or the like. A BBD will be understood to be an analog shift register capable of storing and shifting discrete analog samples.

The threshold selection module 404 can include an MxN:x analog multiplexer 412 coupled to receive selected ones 406a of the analog samples and configured to generate an output signal 412a, which can have one or more analog signals corresponding to one or more selected ones 406a of the analog samples. An analog function circuit 414 can be coupled to receive the output signal 412a and can be configured to perform a function upon the output signal 412a. The function performed by the analog function module 414 can be the same as or similar to the functions described above in conjunction with the function processor 338 of FIG. 5. However, the analog function circuit 414 can perform the functions with analog circuits.

The threshold selection module 404 is configured to generate a selected threshold signal 404a, which can be the same as or similar to the selected threshold signal 326a of FIG. 5.

The circuit 400 can include the comparator 308 coupled to receive the selected threshold signal 404 and coupled to receive the DIFF signal 306a an configured to generate a PosComp signal 402, which can be the same as or similar to the PosComp signal 308a of FIG. 5.

Figure 8:
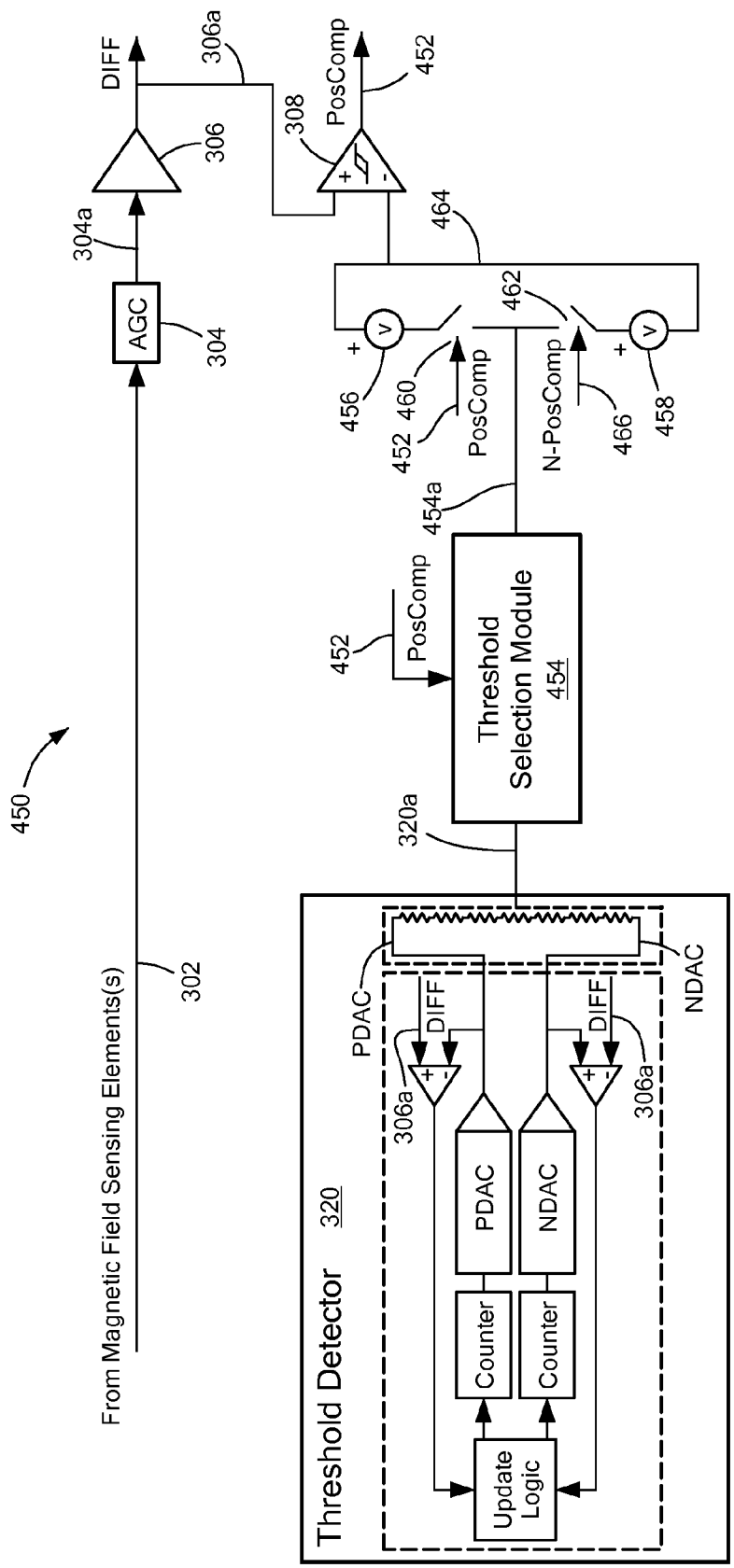
FIG. 8 is a block diagram of yet another exemplary motion detector that can be used in place of the motion detectors of FIGS. 1, 1A, 2, and 2A, which has an analog threshold generator in the form of a threshold detector, which is discussed above, an analog comparator, a threshold selection module disposed between the threshold generator circuit and the comparator, and which is configured to generate two thresholds before the comparator.

Referring now to FIG. 8, in which like elements of FIG. 5 are shown having like reference designations, a circuit 450 can include a threshold selection module 454, which can be the same as or similar to threshold selection modules 326, 404 of FIGS. 5 and 7, respectively. The threshold selection module is coupled to receive a PosComp signal 452 and the threshold signal 320a and configured to generate a selected threshold signal 454a. The selected threshold signal 454a can be the same as or similar to the selected threshold signal 326a of FIG. 5 or the selected threshold signal 404a of FIG. 6.

The selected threshold signal 454a is received by first and second switches 460, 462, respectively. The first switch 460 is controlled by the PosComp signal 452 and the second switch 462 is controlled by and inverted version of the PosComp signal 466, resulting in the two switches 460, 462 opening and closing alternately.

A first voltage source 456 is coupled to receive an output signal from the first switch 460 at its negative node and a second voltage source 458 is coupled to receive an output signal from the second switch 462 at its positive node.

A threshold signal 464 alternates between two signal levels in the same way as the threshold signal 138 of FIG. 2. The comparator 308 is coupled to receive the threshold signal 464 and the DIFF signal 306a and configured to generate the PosComp signal 452.

Figure 9:
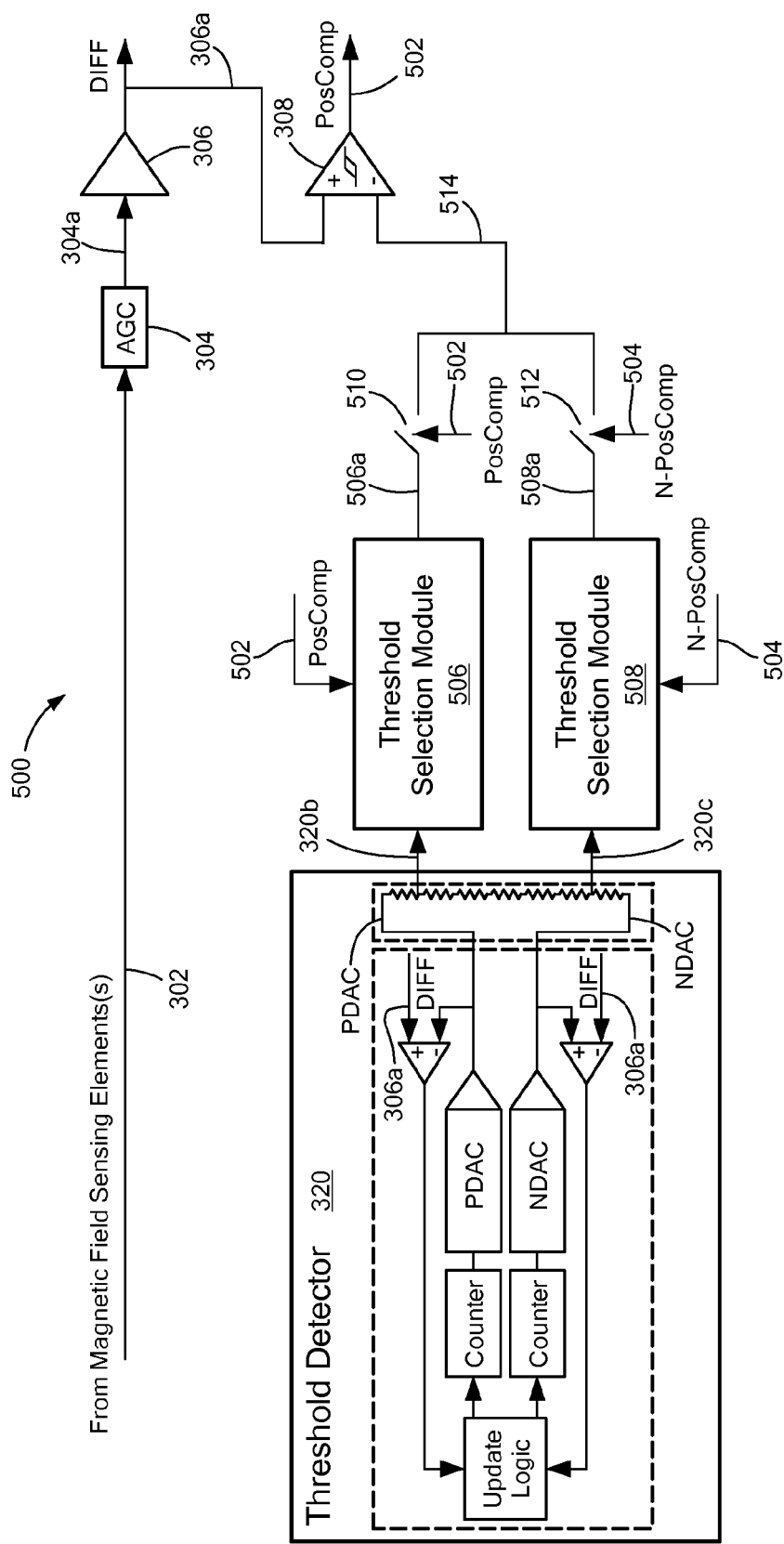
FIG. 9 is a block diagram of yet another exemplary motion detector that can be used in place of the motion detectors of FIGS. 1, 1A, 2, and 2A, which has an analog threshold generator in the form of a threshold detector, which is discussed above, an analog comparator, and two threshold selection modules disposed between the threshold generator circuit and the comparator, and which is configured to generate two threshold before the comparator.

Referring now to FIG. 9, in which like elements of FIG. 5 are shown having like reference designations, a circuit 500 can achieve the two alternating thresholds of FIG. 8, but in a different way. Here, the threshold generation module 320 is configured to generate two threshold signals 320b, 320c instead of the one threshold signal 320a of FIG. 5.

A first threshold selection module 506 is coupled to receive the threshold signal 320b and a second threshold selection module 508 is coupled to receive the threshold signal 320c. The first threshold selection module 506 is also coupled to receive a PosComp signal 502 and the second threshold selection module 508 is also coupled to receive an inverted PosComp signal 504, which signals clock the respective first and second threshold selection modules 504, 506, in the same way that the PosComp signal 308a of FIG. 5 clocks the threshold selection module 326 of FIG. 5.

The threshold selection modules 506, 508 can be the same as or similar to the threshold selection modules 326 and 404 of FIGS. 5 and 7, respectively.

The first threshold selection module 506 is configured to generate a first selected threshold signal 506a and the second threshold selection module 508 is configured to generate a second selected threshold signal 508a, each of which can be the same as or similar to the selected threshold signal 326a of FIG. 5.

A first switch 510 is coupled to receive the first selected threshold signal 504a and a second switch 512 is coupled to receive the second selected threshold signal 508a. The first switch 512 is controlled by the PosComp signal 502 and the second switch 512 is controlled by the inverted PosComp signal 504. Therefore, like the switches 460 and 462 of FIG. 8, the switches 510, 512 operate alternately to generate a threshold signal 514 that alternates between two signal levels in the same way as the threshold signal 138 of FIG. 2.

The comparator 308 is coupled to receive the threshold signal 514 and the DTP signal 306a and configured to generate the PosComp signal 502.

Figure 10:
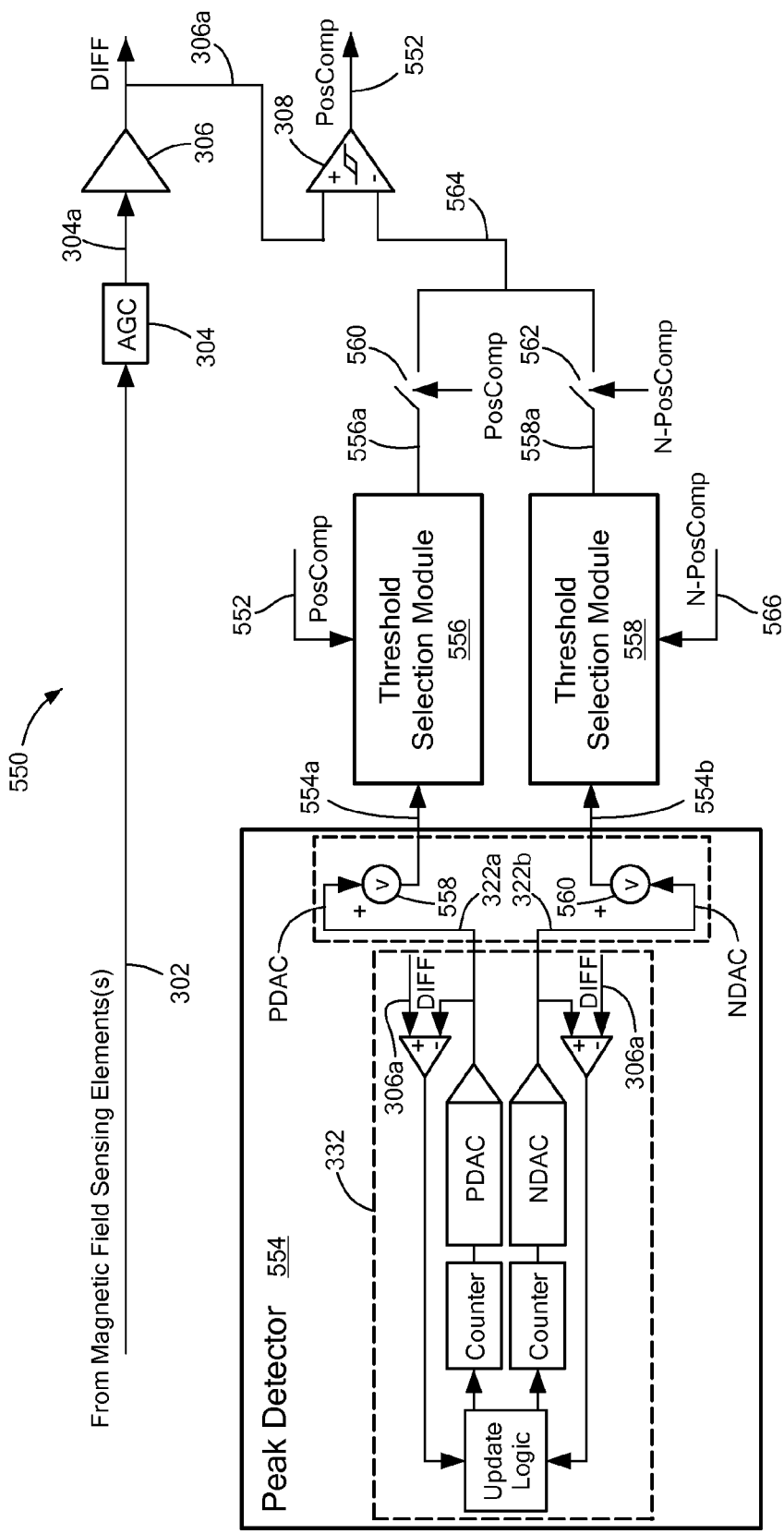
FIG. 10 is a block diagram of yet another exemplary motion detector that can be used in place of the motion detectors of FIGS. 1, 1A, 2, and 2A, which has an analog threshold generator in the form of a peak detector, which is also discussed above, an analog comparator, and two threshold selection modules disposed between the threshold generator circuit and the comparator, and which is configured to generate two threshold before the comparator.

Referring now to FIG. 10, in which like elements of FIG. 5 are shown having like reference designations, the threshold generator circuit 320 of FIG. 5 is replaced with a threshold generator circuit 554, and in particular, the threshold identifier circuit 324 of FIG. 5 is replaced with a threshold identifier circuit 557. Unlike the threshold generator circuit 326 of FIG. 5, which is a threshold detector, the threshold generator circuit 554 is a peak detector.

The threshold identifier circuit 557 includes a first voltage source coupled to receive the tracking signal 322a and a second voltage source 560 coupled to receive the tracking signal 322h. The first voltage source 558 is configured to generate a first threshold signal 554a and the second voltage source 560 is configured to generate a second threshold signal 554b.

First and second threshold selection modules 556, 558 can be the same as or similar to the first and second threshold selection modules 506, 508 of FIG. 9 and are coupled to receive the first and second threshold signals 554a, 554h, respectively. The first threshold selection module 556 is also coupled to receive a PosComp signal 552 and the second threshold selection module 558 is also coupled to receive an inverted PosComp signal 566, which signals clock the respective first and second threshold selection modules 556, 558, in the same way that the PosComp signal 308a of FIG. 5 clocks the threshold selection module 326 of FIG. 5.

The first and second threshold selection modules 556, 558 are configured to generate first and second selected threshold signals 556a, 558a, respectively, which are coupled to first and second switches 560, 562, respectively. The first switch 560 is controlled by the PosComp signal 552 and the second switch 562 is controlled by the inverted PosComp signal 566. Therefore, like the switches 460 and 462 of FIG. 8, the switches 560, 562 operate alternately to generate a threshold signal 564 that alternates between two signal levels in the same way as the threshold signal 138 of FIG. 2.

The comparator 308 is coupled to receive the threshold signal 564 and the DIFF signal 306a and configured to generate the PosComp signal 552.

The circuit module 310 of FIG. 5 is not shown in FIGS. 7-10, however, in other embodiments, the circuits 400, 450, 500, and 550 of FIGS. 7-10 can include a circuit module the same as or similar to the circuit module 310.

It should be appreciated that parts of the circuits of FIGS. 5-10 can be interchanged with each other. For example, an analog threshold selection module such as the threshold selection module 404 of FIG. 7 can be used in any of the circuits of FIGS. 5-10.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of detecting movement of an object, comprising:
    generating a magnetic field signal with at least one magnetic field sensing element, wherein the magnetic field signal is proportional to a magnetic field associated with the object, wherein the magnetic field signal has cycles including a first cycle occurring during a first time period and a second cycle occurring during a second time period, the first time period occurring in time before the second time period;
    generating a tracking signal that tracks at least a portion of the magnetic field signal;
    using the tracking signal to generate a threshold sample in accordance with the first cycle of the magnetic field signal; and
    comparing the threshold sample generated in accordance with the first cycle of the magnetic field signal to the second cycle of the magnetic field signal.

2. The method of claim 1, wherein the object is configured to rotate, and the first cycle of the magnetic field signal occurs during a first revolution of the object and the second cycle of the magnetic field signal occurs during a second different revolution of the object.

3. The method of claim 1, wherein the object is configured to rotate, wherein the object has features associated with the cycles as they pass most proximate to the at least one magnetic field sensing element, and wherein the first cycle of the magnetic field signal is associated with a first one of the features and the second cycle of the magnetic field is associated with a second different one of the features.

4. The method of claim 1, wherein the using comprises:
    selecting a first threshold sample associated with a first predetermined cycle of the tracking signal a first predetermined number of cycles prior to the second cycle;
    selecting a second threshold sample associated with a second predetermined cycle of the tracking signal a second predetermined number of cycles prior to the second cycle; and
    combining the first and second samples.

5. The method of claim 4, wherein the combining comprises averaging the first and second samples.

6. The method of claim 1, further comprising:
    storing the threshold sample in an electronic memory device; and
    recalling the threshold sample from the electronic memory device for the comparing.

* * * * *